(12) United States Patent
Sethuraman et al.

(10) Patent No.: US 11,051,026 B2
(45) Date of Patent: Jun. 29, 2021

(54) METHOD AND SYSTEM OF FRAME RE-ORDERING FOR VIDEO CODING

(71) Applicant: INTEL CORPORATION, Santa Clara, CA (US)

(72) Inventors: Ramanathan Sethuraman, Bangalore (IN); Sumit Mohan, San Jose, CA (US); Changliang Wang, Bellevue, WA (US); Hong Jiang, El Dorado Hills, CA (US); Jean-Pierre Giacalone, Sophia-Antipolis (FR)

(73) Assignee: Intel Corporation, Santa Clara, CA (US)

( * ) Notice: Subject to any disclaimer, the term of this patent is extended or adjusted under 35 U.S.C. 154(b) by 1103 days.

(21) Appl. No.: 14/841,624

(22) Filed: Aug. 31, 2015

(65) Prior Publication Data

US 2017/0064309 A1    Mar. 2, 2017

(51) Int. Cl.
| | |
|---|---|
| *H04N 19/44* | (2014.01) |
| *H04N 19/61* | (2014.01) |
| *H04N 19/85* | (2014.01) |
| *H04N 19/159* | (2014.01) |
| *H04N 19/577* | (2014.01) |
| *H04N 19/433* | (2014.01) |
| *H04N 19/127* | (2014.01) |
| *H04N 19/172* | (2014.01) |

(52) U.S. Cl.
CPC ......... *H04N 19/159* (2014.11); *H04N 19/127* (2014.11); *H04N 19/172* (2014.11); *H04N 19/433* (2014.11); *H04N 19/577* (2014.11)

(58) Field of Classification Search
CPC .. H04N 19/159; H04N 19/127; H04N 19/172; H04N 19/433; H04N 19/577; H04N 19/61; H04N 19/436; H04N 19/176; H04N 19/423; H04N 19/44; H04N 19/85
See application file for complete search history.

(56) References Cited

U.S. PATENT DOCUMENTS

| | | | |
|---|---|---|---|
| 6,950,465 B1 * | 9/2005 | Yokoyama | H04N 5/145 348/E5.066 |
| 2005/0031042 A1 | 2/2005 | Zhang et al. | |
| 2005/0162436 A1 * | 7/2005 | Van Hook | G06T 15/005 345/546 |
| 2006/0088097 A1 * | 4/2006 | Park | H04N 19/61 375/240.03 |
| 2007/0165712 A1 * | 7/2007 | Van Der Wolf | H04N 19/61 375/240 |

(Continued)

FOREIGN PATENT DOCUMENTS

| | | |
|---|---|---|
| CN | 100373943 | 8/2006 |
| CN | 1926885 | 3/2007 |

(Continued)

OTHER PUBLICATIONS

Rafique et al., "DMA-based Prefetching for I/O Intensive Workloads on the Cell Architecture", CF'08, May 5-7, 2008, Ischia, Italy, 10 pages.

(Continued)

*Primary Examiner* — Patrick E Demosky
(74) *Attorney, Agent, or Firm* — Green, Howard & Mughal LLP.

(57) ABSTRACT

Techniques related to frame re-ordering for video coding are described herein.

21 Claims, 21 Drawing Sheets

(56) References Cited

U.S. PATENT DOCUMENTS

| | | | |
|---|---|---|---|
| 2008/0232462 A1 | 9/2008 | Van Doren et al. | |
| 2009/0219446 A1 | 9/2009 | Beric et al. | |
| 2010/0054332 A1 | 3/2010 | Chikamura et al. | |
| 2010/0142534 A1* | 6/2010 | Elzur | H04L 12/2856 370/394 |
| 2011/0109721 A1 | 5/2011 | Hong et al. | |
| 2011/0150085 A1* | 6/2011 | Andrijanic | H04N 19/433 375/240.12 |
| 2011/0280312 A1* | 11/2011 | Gaur | H04N 19/44 375/240.25 |
| 2012/0170667 A1 | 7/2012 | Girardeau, Jr. et al. | |
| 2012/0240174 A1* | 9/2012 | Rhyu | H04L 65/608 725/109 |
| 2014/0140407 A1 | 5/2014 | Yu et al. | |
| 2014/0348249 A1 | 11/2014 | Sullivan | |
| 2015/0084970 A1* | 3/2015 | Schaub | H04N 19/61 345/506 |
| 2017/0048534 A1* | 2/2017 | Croxford | H04N 19/40 |

FOREIGN PATENT DOCUMENTS

| | | |
|---|---|---|
| CN | 101243690 | 8/2008 |
| CN | 101543082 | 9/2009 |

OTHER PUBLICATIONS

International Preliminary Report on Patentability dated Mar. 15, 2018 for PCT Patent Application No. PCT/US16/44066.

International Search Report and Written Opinion, dated Nov. 3, 2016, for PCT Patent Application No. PCT/US16/44066.

Office Action for Chinese Patent Application No. 2016800503722, dated Apr. 1, 2020.

English Translation of Office Action for Chinese Patent Application No. 201680050372.2, dated Jan. 12, 2021.

English Translation of Office Action for Chinese Patent Application No. 201680050372.2, dated Sep. 23, 2020.

* cited by examiner

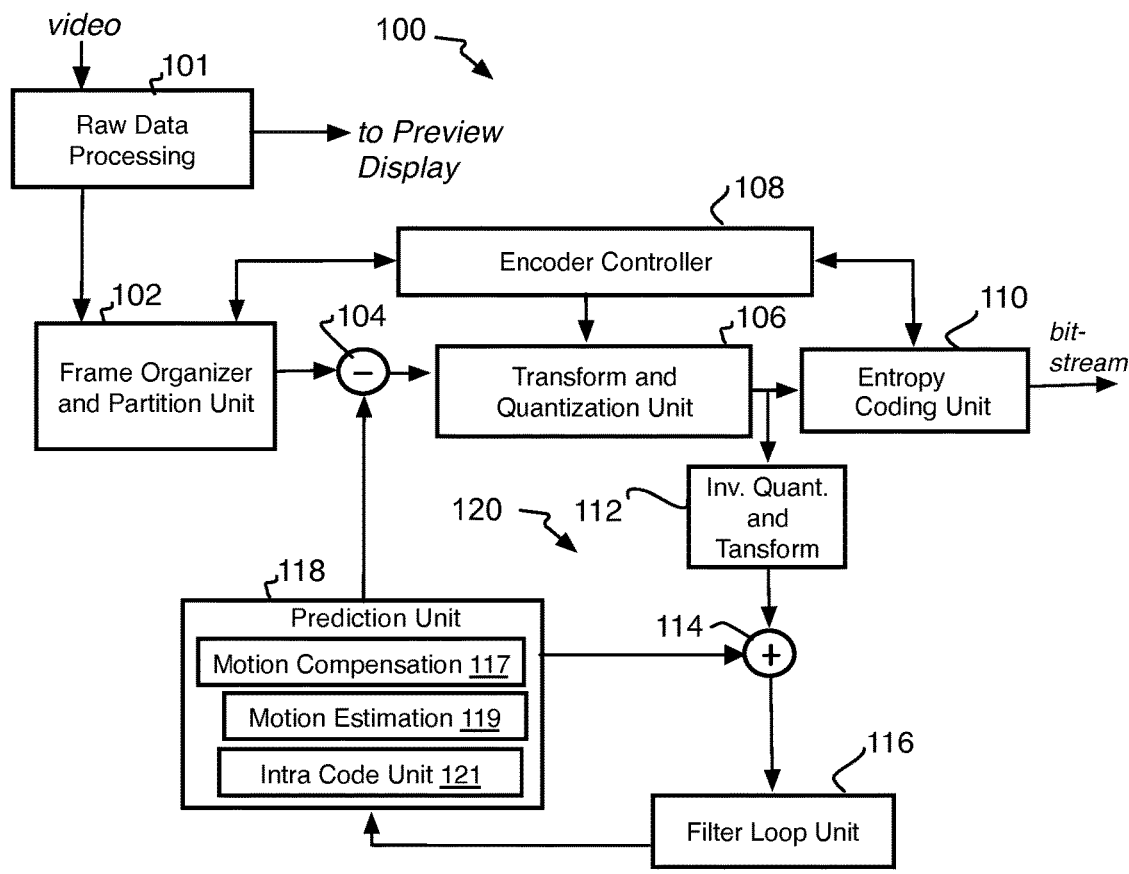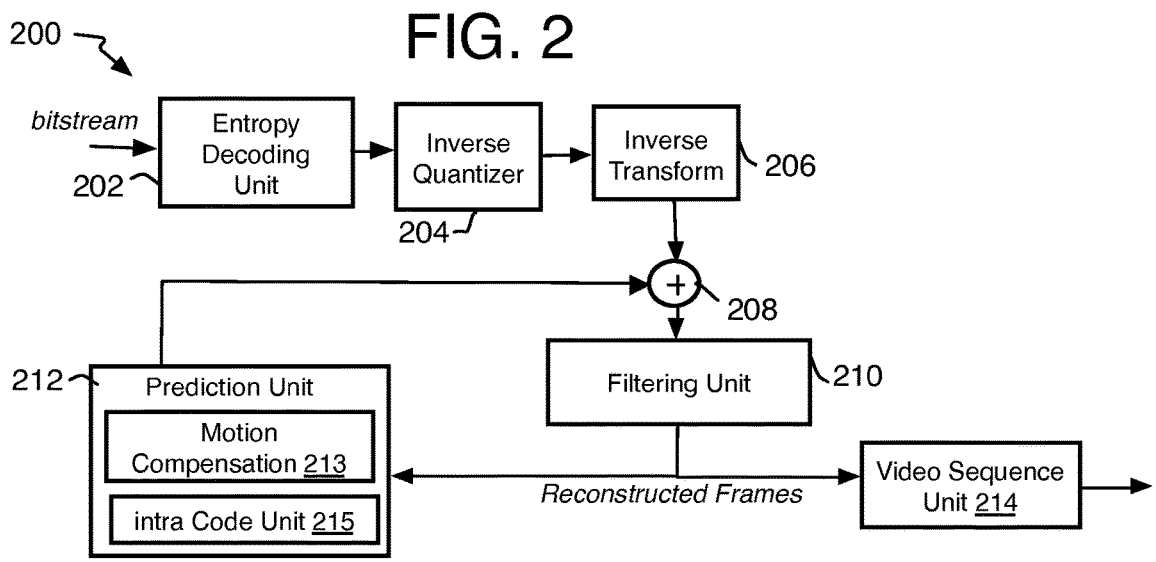

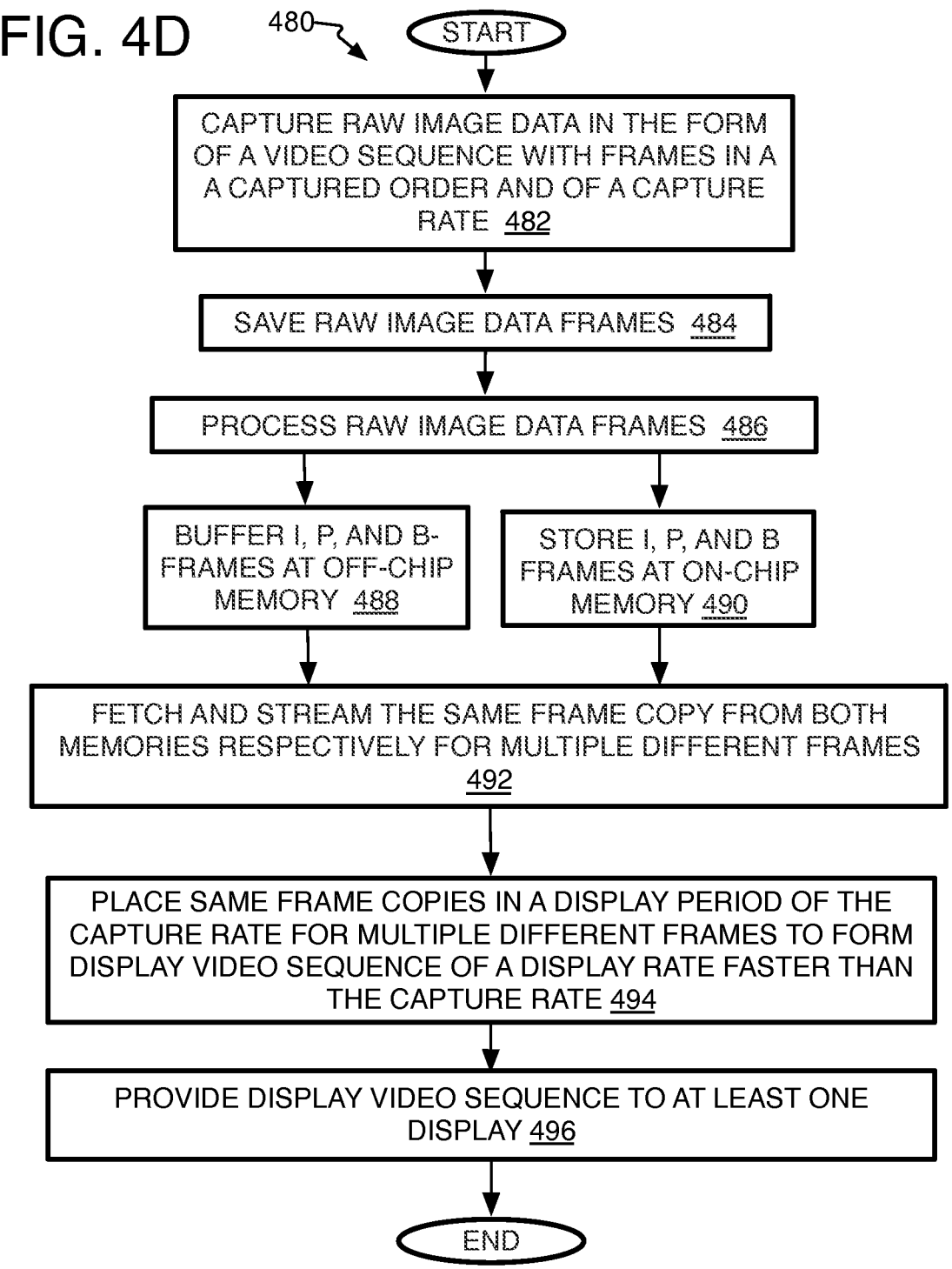

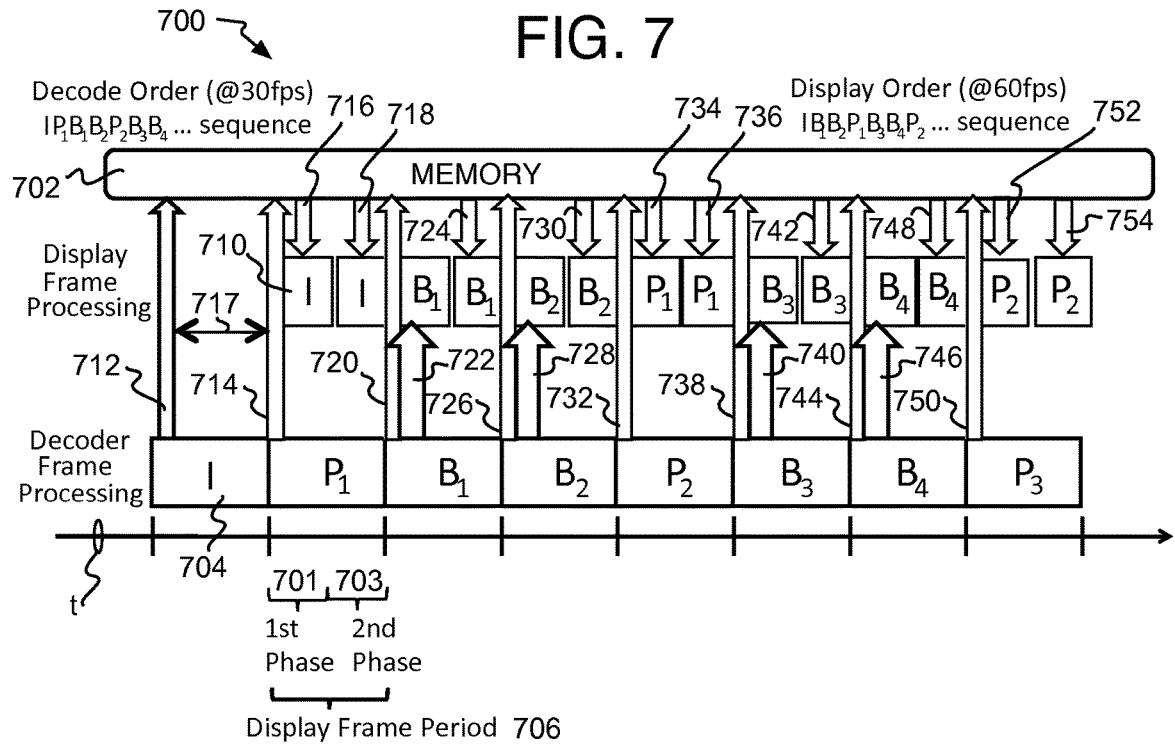
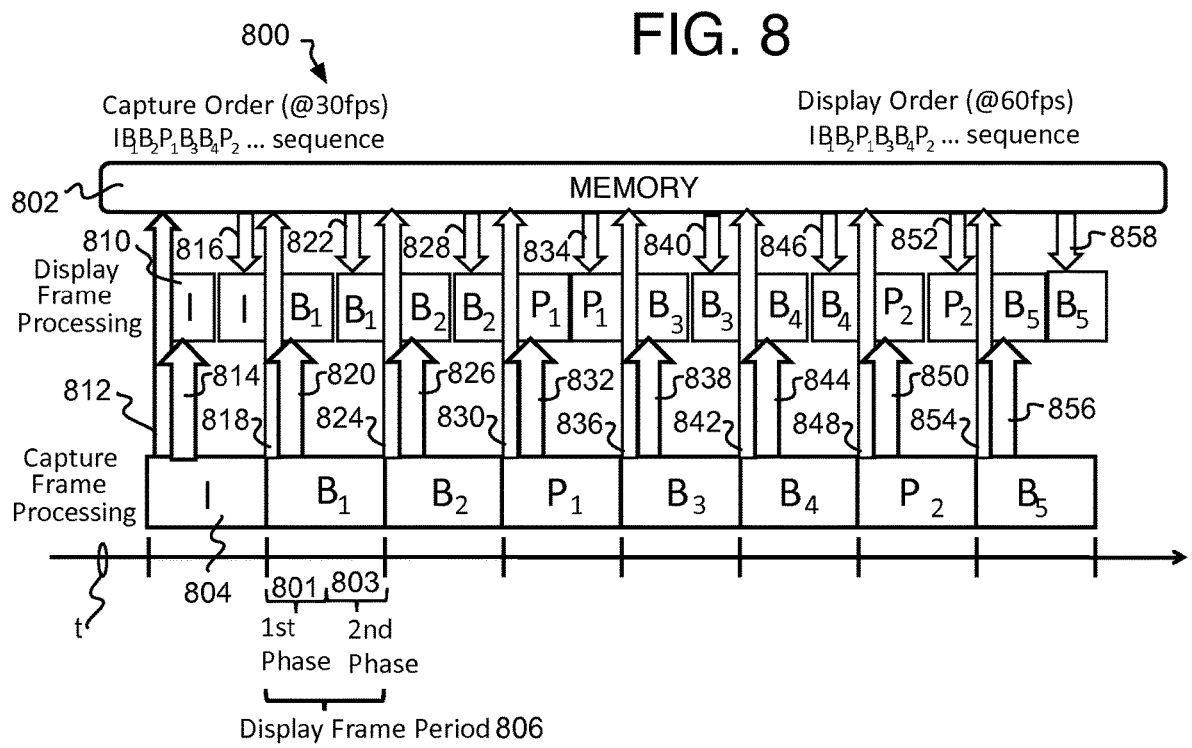

METHOD AND SYSTEM OF FRAME RE-ORDERING FOR VIDEO CODING

BACKGROUND

Due to ever increasing video resolutions, and rising expectations for high quality video images, a high demand exists for efficient image data compression and display of video. Video coding and display systems may include an image capture device, such as a camera, that records the video, and an encoder that generates data regarding video frames that can be efficiently transmitted in a bitstream to a decoder and then used to reconstruct the video frames, or may be immediately displayed on a preview screen of the image capture device. A decoder may receive the bitstream to reconstruct the frames of the video sequence and then display the video on the same or a different display device.

One goal of such video coding and display systems is to minimize the use of the temporary memory such as read access memory (RAM) during specific coding tasks such as re-ordering the frames for display of the video. This may be performed to reduce delay in fetching data from the temporary memory as well as to reduce consumed temporary memory bandwidth so that greater memory capacity is available for other applications or to perform more video coding or display tasks using temporary memory instead of the frame re-ordering. Frame re-ordering by the conventional video coding systems, however, heavily relies on the RAM to perform the re-ordering. Specifically, the video coding systems use frame re-ordering to perform inter-prediction which uses reference frames and motion vectors that indicate the movement of image content between a reference frame and another frame being reconstructed in a sequence of video frames. Such reference frames may be I-frames (or intra-coded frames) that use spatial prediction rather than frame-to-frame prediction as in inter-prediction, and P-frames which are predicted frames, or future frames in the video sequence and relative to a current frame being reconstructed. A B-frame is a bi-directional frame that is reconstructed from either a reference frame from the past or future, or both, along the video sequence and relative to the frame being reconstructed. When a video is recorded (or captured), the frames are in chronological order as captured, and the same order is to be used for display. For encoding and decoding, however, the reference frames must be coded before the frame to be inter-predicted by using those reference frames. Thus, the P-frame is usually re-ordered in a sequence of frames and from after the frame to be reconstructed to before the frame to be reconstructed for video encoding, and then put back in chronological order again for display. This change in position to place the P-frames back in chronological order also occurs after decoding to display the video. To perform this re-ordering, all of the coded frames (ready for display) are typically stored on the RAM so that the P-frames and other frames can be fetched out of order and as needed which consumes a substantial amount of RAM bandwidth which could be used for other purposes, and causes delay since the RAM is off-chip or external memory relative to the processor performing the coding.

Also, many high definition devices provide 60 fps video displays. Non-high definition devices still may record video at 30 fps (or the option may still be provided to code for playback on 30 fps displays). A substantial amount of RAM bandwidth is consumed to convert a captured or decoded 30 fps video to a 60 fps video for high definition display on the conventional video coding systems.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 1 is an illustrative diagram of an example encoder for a video coding system;

FIG. 2 is an illustrative diagram of an example decoder for a video coding system;

FIG. 4D is a detailed flow chart of an example method of frame re-ordering from a captured order to a display order while changing to a video display rate;

FIG. 7 is a schematic timeline diagram to explain frame re-ordering from decoder frame order at 30 fps to display frame order at 60 fps according to the implementations herein;

FIG. 8 is a schematic timeline diagram to explain frame re-ordering from capture frame order at 30 fps to preview display frame order at 60 fps according to the implementations herein;

DETAILED DESCRIPTION

Figure 3:
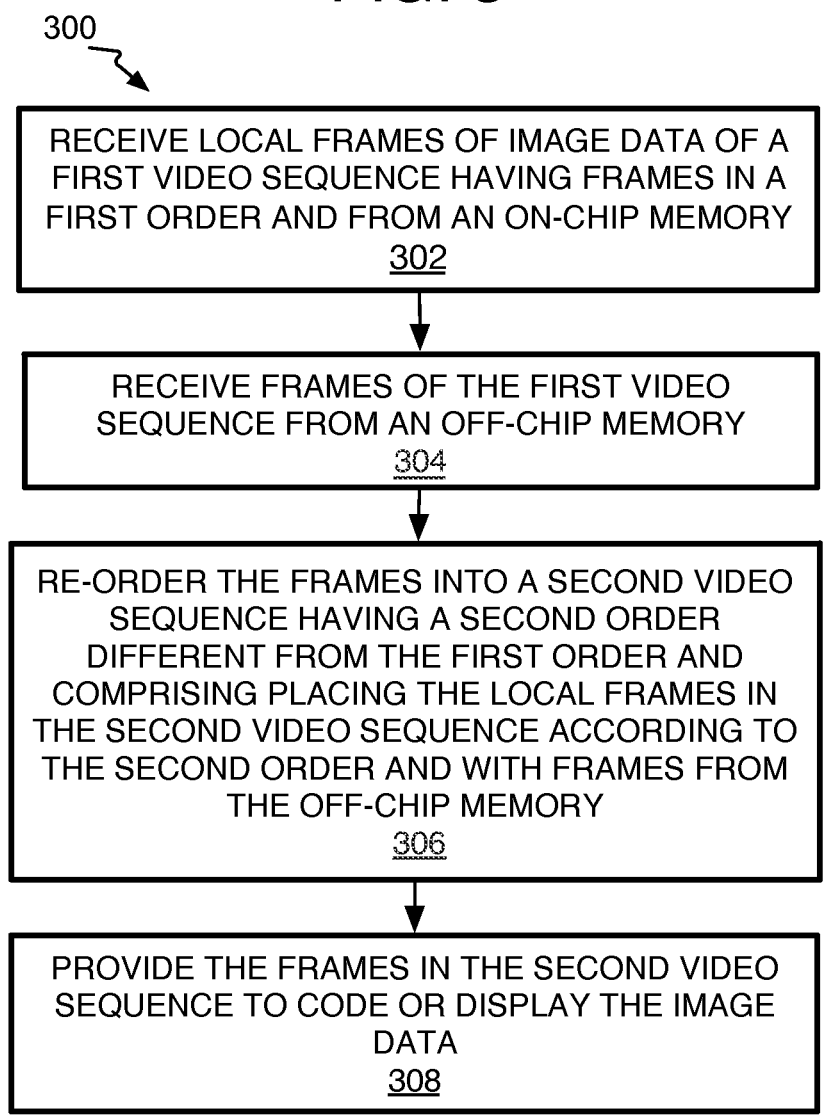
FIG. 3 is a flow chart of an example method of frame re-ordering for video coding.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by many different architectures and/or computing systems for similar purposes as long as certain minimum components are provided such as an on-chip or other local memory and an off-chip or external memory relative to a processor chip and as described herein. For instance, various architectures employing, for example, multiple integrated circuit (IC) chips and/or packages, and/or various computing devices and/or consumer electronic (CE) devices such as game consoles, set top boxes, televisions, desktop or laptop computers, tablets or pads, smart phones, wearable devices, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM) including dynamic RAM (DRAM) or double data rate (DDR) DRAM; magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to frame re-ordering for video coding.

As mentioned, one goal of video coding and display systems is to minimize the use of the temporary memory, and particularly off-chip or external memory such as read access memory (RAM). One video coding task that uses relatively substantial memory is the re-ordering of the frames between certain video coding and/or display tasks. A reduction in off-chip temporary memory use for frame re-ordering could reduce delay caused by fetching data from the off-chip temporary memory as well as reduce consumed temporary memory bandwidth so that greater memory capacity is available for other applications or to perform more video coding or display tasks that use the temporary memory rather than being consumed by frame re-ordering. It should be noted that the term bandwidth as used herein refers to the amount of data that is used or consumed unless described otherwise or understood from the context.

One solution is to use direct connect streaming between media image processors (IPs) to optimize platform power beyond what can be achieved by the best memory compression technique. Streaming requires that the frames, and specifically the pixel data forming the frames, is consumed on the fly so that the frames need only be placed in an on-chip or local (or internal) memory as the frames are being processed. The direct connect is typically used when frame re-ordering is unnecessary. The frame re-ordering is unnecessary when the frames are in an IPP or IBB low delay or similar video sequence order where temporal shifting of frames does not occur. In these cases, video coding or graphics processors, such as a system on chip (SOC) processor that has its own on-chip memory, do not need to write the frames to off-chip temporary memory such as RAM for processing the frames.

Conventionally, however, any temporal nature of surface or frame pixel usage may require the frame pixel data to be written or buffered to the off-chip temporary memory for future consumption. Specifically, streaming cannot typically be enabled during video encoding or decoding where the group of pictures (GOP) structure uses B-frames and P-frames that are re-ordered such as with IBBP GOP used for systems that provide random access or with advanced video coding (AVC) standards for example. Specifically, frame re-ordering by the conventional video coding systems heavily relies on the off-chip temporary memory such as RAM to perform the re-ordering. The video coding systems use frame re-ordering to perform inter-prediction so that a video encoder may achieve compression by taking advantage of redundancy between reference frame and another frame being reconstructed in a sequence of video frames. Motion vectors indicate the movement (or redundancy) of image content from frame to frame. Such reference frames may be I-frames (or intra-coded frames) that themselves use spatial prediction rather than frame-to-frame prediction as in inter-prediction, and P-frames which are predicted frames, or future frames in the video sequence and relative to a current frame being reconstructed. A B-frame is a bi-directional frame that is reconstructed from either a reference frame from the past or future, or both, along the video sequence and relative to the frame being reconstructed. By utilizing the B-frame picture type, the encoder is able to look both backwards and forwards temporally to achieve the highest data compression.

When a video is captured, the frames are in chronological order as captured, and the same order to be used for display. This chronological order is typically in an $I_0 B_1 B_2 P_1 B_3 B_4 P_2$ video sequence where the P-frame is positioned after the B-frames that are reconstructed by using the P-frame. For encoding and decoding with P-frames and B-frames, however, the reference frames must be coded before the frame to be inter-predicted by using those reference frames. Thus, the P-frame from the bitstream is usually re-ordered in a sequence of frames and from a position after the frame to be reconstructed to a position before the frame to be reconstructed for video encoding or decoding as follows: I $P_1 B_1 B_2 P_2 B_3 B_4$. The P-frame is then placed back in captured or chronological order again into a video sequence or bitstream for display by reversing the re-ordering and converting from encoder/decoder order to display order. To perform this re-ordering and enable temporal bi-directional prediction, all of the coded frames are typically buffered in the off-chip temporary memory for temporal consumption, or in other words, so that the P-frames and other frames can be fetched out of order and as needed which consumes a substantial amount of RAM bandwidth.

To resolve these issues, the present method of re-ordering frames for video coding may include directly streaming at least one type of picture or frame, such as either B-frames or P-frames, into a display or coding video sequence (or bitstream) for a next video coding task (including transmission to a display) without placing the frames in the off-chip temporary memory. When re-ordering frames from a captured ordered to an encoder order, I and B frames may be written to the off-chip buffer while P-frames are streamed directly to the new video sequence to be encoded and including both the directly streamed frames from the on-chip memory and the frames from the off-chip buffer. Likewise, frames in a decoder order received from a decoder may be re-ordered into a display order by buffering the I and P-frames into the off-chip memory while placing the B-frames into the on-chip memory for direct streaming into the bitstream to display the video. The frames re-ordered by direct streaming rather than buffering to the off-chip memory will provide the savings in memory bandwidth as explained herein.

Also as mentioned, many high definition devices provide 60 fps video displays. However, non-high definition devices still may record video at 30 fps (or the option may still be provided to code for playback on 30 fps displays). To convert to a different frame rate such as from 30 fps coding rate to 60 fps for display in a conventional system, multiple copies of a frame are obtained to fill a single display frame period of the slower speed bitstream when constructing a newer video sequence bitstream for the next video coding task. Instead of fetching all multiple copies of each frame from the off-chip memory, some of the copies may be directly streamed from on-chip memory to the new video sequence. For example, when re-ordering frames from a decoder order to a display order, the B-frames may be copied to both the off-chip memory and on-chip memory so that each copy of the frame then may be used to construct the display frame period of the new faster video sequence for display rather than obtaining two copies of the B-frame from the off-chip memory. Likewise, even when not re-ordering the frames, such as for displaying video for a preview screen from frames in a captured order, each frame may have one copy placed in off-chip memory and another copy placed in on-chip memory so that multiple display frame periods at the display video sequence are filled with copies from both memories, and this may be regardless of the type of picture (I, B, or P) of the frame. In both examples, off-chip memory bandwidth is being reduced whenever frames are fetched from on-chip memory rather than off-chip memory to convert frame rates between video coding tasks. These and many other examples are explained below.

Referring to FIGS. 1-2, to place the method and system of frame re-ordering herein in context, an example, simplified video coding system 100 is arranged with at least some implementations of the present disclosure and that performs inter-prediction and other video coding operations that may require frame re-ordering for video sequence construction. In various implementations, video coding system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (MPEG-4), H.265 (High Efficiency Video Coding or HEVC), but could also be applied to VP9 or other VP#-based standards. Although systems 100 and/or other systems, schemes, or processes may be described herein, the features of the present disclosure are not necessarily all always limited to any particular video encoding standard or specification or extensions thereof.

As used herein, the term "coder" may refer to an encoder and/or a decoder. Similarly, as used herein, the terms "coding" or "code" may refer to encoding via an encoder and/or decoding via a decoder. A coder, encoder, or decoder may have components of both an encoder and decoder.

In some examples, video coding system 100 may include additional items that have not been shown in FIG. 1 for the sake of clarity. For example, video coding system 100 may include a processor, a radio frequency-type (RF) transceiver, splitter and/or multiplexor, a display, and/or an antenna. Further, video coding system 100 may include additional items such as a speaker, a microphone, an accelerometer, memory, a router, network interface logic, and so forth.

For the example video coding system 100, the system may be an encoder where current video information in the form of data related to a sequence of video frames may be received for compression. The system 100 may include or be connected to a pre-processing unit 101 that refines the image data and that either then provides the image data to a preview display or to the encoder units for compression or storage. For the compression operations, the system 100 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 100 may include a frame organizer and partition unit 102, a subtraction unit 104, a transform and quantization unit 106, an entropy coding unit 110, and an encoder controller 108 communicating with and/or managing the different units. The controller 108 manages many aspects of encoding including rate distortion, selection or coding of partition sizes, prediction reference types, selection of prediction and other modes, and managing overall bitrate, as well as others.

The output of the transform and quantization unit 106 also may be provided to a decoding loop 120 provided at the encoder to generate the same reference or reconstructed blocks, frames, or other frame partitions as would be generated at the decoder. Thus, the decoding loop 120 uses inverse quantization and transform unit 112 to reconstruct the frames, and adder 114 along with other assembler units not shown to reconstruct the blocks within each frame. The decoding loop 120 then provides a filter loop unit 116 to increase the quality of the reconstructed images to better match the corresponding original frame. This may include a deblocking filter, a sample adaptive offset (SAO) filter, and a quality restoration (QR) filter. The decoding loop 120 also may have a prediction unit 118 with a decoded picture buffer to hold reference frame(s), and a motion estimation 119 and motion compensation unit 117 that uses motion vectors for inter-prediction explained in greater detail below, and intra-frame prediction module 121. Intra-prediction or spatial prediction is performed on a single I-frame without reference to other frames. The result is the motion vectors and predicted blocks (or coefficients).

In more detail, the motion estimation unit 119 uses pixel data matching algorithms to generate motion vectors that indicate the motion of image content between one or more reference frames and the current frame being reconstructed. The motion vectors are then applied by the motion compensation unit 117 to reconstruct the new frame. Then, the prediction unit 118 may provide a best prediction block both to the subtraction unit 104 to generate a residual, and in the decoding loop to the adder 114 to add the prediction to the residual from the inverse transform to reconstruct a frame. Other modules or units may be provided for the encoding but are not described here for clarity.

More specifically, the video data in the form of frames of pixel data may be provided to the frame organizer and partition unit 102. This unit may assign frames a classification such as I-frame (intra-coded), P-frame (inter-coded, predicted from a future reference frame), and B-frame (inter-coded frame which can be bi-directionally predicted from previous frames, subsequent frames, or both). In each case, an entire frame may be classified the same or may have slices classified differently (thus, an I-frame may include only I slices, P-frame can include I and P slices, and so forth). While the entire frame is used for explanation below, it will be understood that less than the entire frame may be involved. In I-frames, spatial prediction is used, and in one form, only from data in the frame itself. In P-frames, temporal (rather than spatial) prediction may be undertaken by estimating motion between frames. In B-frames, and for HEVC, two motion vectors, representing two motion estimates per partition unit (PU) (explained below) may be used for temporal prediction or motion estimation. In other words, for example, a B-frame may be predicted from slices on frames from either the past, the future, or both relative to the B frame. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

When an HEVC standard is being used, the frame organizer and partition unit 102 also may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block may also be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs may also have various sizes including, but not limited to, 2N×2N, 2N×N, N×2N, N×N, 2N×0.5N, 2N×1.5N, 0.5N× 2N, and 1.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like, or otherwise a 4×4 or 8×8 or other rectangular shaped block. By some alternatives, this may include considering the block as a division of a macroblock of video or pixel data for H.264/AVC and the like, unless defined otherwise.

The frame organizer and partition unit 102 may also hold frames in an input video sequence order (i.e., the capture order, which is the same as the display order, such as IBBPBBP . . . ), and the frames may be streamed from on-chip memory (or in other words, the ISP or encoder), fetched from off-chip memory, or both as explained in detail below, and in the order in which they need to be coded (such as IPBBPBB . . . ). For example, backward reference frames are coded before the frame for which they are a reference but are displayed after it.

The current blocks or frames may be subtracted at subtractor 104 from predicted blocks or frames from the prediction unit 118, and the resulting difference or residual is partitioned as stated above and provided to a transform and quantization unit 106. The relevant block or unit is transformed into coefficients using discrete cosine transform (DCT) and/or discrete sine transform (DST) to name a few examples. The quantization then uses lossy resampling or quantization on the coefficients. The generated set of quantized transform coefficients may be re-ordered and then are ready for entropy coding. The coefficients, along with motion vectors and any other header data, are entropy encoded by unit 110 and placed into a bitstream for transmission to a decoder. The frames in the bitstream being transmitted from the encoder and available for a decoder is maintained in the coder (encoder/decoder) order (IPBBPBB . . . ).

Referring to FIG. 2, an example, simplified system 200 may have, or may be, a decoder, and may receive coded video data in the form of a bitstream and with frames in decoder order (IPBBPBB . . . ). The system 200 may process the bitstream with an entropy decoding unit 204 to extract quantized residual coefficients as well as the motion vectors, prediction modes, partitions, quantization parameters, filter information, and so forth.

The system 200 then may use an inverse quantization module 204 and inverse transform module 206 to reconstruct the residual pixel data. Thereafter, the system 200 may use an adder 208 to add assembled residuals to predicted blocks to permit rebuilding of prediction blocks. These blocks or entire reconstructed frames may be passed to the prediction unit 212 for intra-prediction, or first may be passed to a filtering unit 210 to increase the quality of the blocks and in turn the frames, before the blocks are passed to the prediction unit 212 for inter-prediction. The completed reconstructed frames also may be provided to a video sequence unit 214 that streams the frames from on-chip or fetches the frames from off-chip memory and forms the sequence in display order (IBBPBBP . . . ) to provide the bitstream to a display or for storage, and as explained in detail herein. To form the residuals, the prediction unit 212 may include a motion compensation unit 213 to apply the motion vectors. The prediction unit 212 may set the correct mode for each block or frame before the blocks or frames are provided to the adder 208. Otherwise, the functionality of the units described herein for systems 100 and 200 are well recognized in the art and will not be described in any greater detail herein.

For one example implementation, an efficient frame re-ordering process is described as follows.

Referring to FIG. 3, a flow chart illustrates an example process 300, arranged in accordance with at least some implementations of the present disclosure. In general, process 300 may provide a computer-implemented method of video coding, and particularly frame re-ordering for video coding. In the illustrated implementation, process 300 may include one or more operations, functions or actions as illustrated by one or more of operations 302 to 308 numbered evenly. By way of non-limiting example, process 300 may be described herein with reference to operations discussed with respect to FIGS. 1-2, 5-16 and 18 with regard to example systems 100, 200, 1000, 1200, 1400, 1600, or 1800 and timelines 500, 600, 700, and 800 discussed herein.

The process 300 may comprise "receive local frames of image data of a first video sequence having frames in a first order and from an on-chip memory" 302, and as understood, the image data may include chroma and luminance pixel data as well as any other data to encode, decode, or display the video sequence. The first order may be the order of the frames as the frames were captured (which may be the same as the order for displaying the frames), or may be in an order for encoding the frames, or decoding the frames. The local frames may be one or more certain types of pictures, such as I-frames, B-frames, and/or P-frames, of the first video sequence. As explained herein, when re-ordering frames from a capture order to an encode order, the local frames may be the P-frames, while when re-ordering the frames from a decoder order to a display order, the local frames may be the B-frames. Other and different examples, including when converting the video sequence for a different display rate (such as from 30 fps to 60 fps for example) or different scales (such as from 8 k to 4 k for example) are described below.

The on-chip memory may be cache or other memory sharing the processor chip such as on a system on a chip (SOC) or other such structures. Thus, receiving the local frames from the on-chip memory refers to direct streaming of the frames from the on-chip memory (or in other words, from an ISP or decoder that had the frames placed on the on-chip memory).

The process 300 also may include "receive frames of the first video sequence from an off-chip memory" 304, and in some examples, those frame types that are not saved to the local on-chip memory. Thus, in some examples, when B-frames are sent to local or on-chip memory, the I-frames and P-frames are sent to the off-chip memory. In other examples, such as when converting display rates, some or all of the frames are written to both the on-chip and off-chip memory as described below. The off-chip memory may be a memory external to the processor chip or SOC such as RAM or other such external memories described below so that retrieving frames from the off-chip memory is referred to as fetching the frames.

The process 300 also may include "re-order the frames into a second video sequence having a second order different from the first order and comprising placing the local frames in the second video sequence according to the second order and with frames from the off-chip memory" 306. As described in detail below, this operation may include forming a second video sequence with frames both streamed from the on-chip memory and fetched from the off-chip memory. Thus, certain types of frames may be streamed from on-chip memory such as B-frames or P-frames, while the frames of the remaining types are fetched from off-chip memory, such as off-chip I and P-frames for on-chip B-frames, or off-chip I and B-frames for on-chip P-frames. By other examples, the second video sequence may be formed by fetching the same copy of a frame from both the on-chip and off-chip memories such as when converting to a certain display rate. In these cases, the second video sequence may have multiple copies of a frame from the different memories to form the second video sequence. By example, when the first order is capture order IBBP, the second order may be display order IIBBBBPP, and so forth. The second order may be a display (IBBP) order when the first order is a capture order, encoder order (IPBB), or decoder order (IPBB), or the second order may be an encoder order when the first order is a capture order. It will be noted that IBBP and IPBB order are merely used as examples herein and need not be the only possible order.

The process 300 also may include "provide the frames in the second video sequence to code or display the image data" 308, and this may include providing access to the second video sequence or transmitting the second video sequence to the next video coding components or display to perform the next tasks with the second video sequence whether that is further coding, storing the second video sequence on a non-volatile storage, or storing the second video sequence on a temporary memory for transmission and/or streaming for display. Other variations and examples are provided below.

Figure 4A:
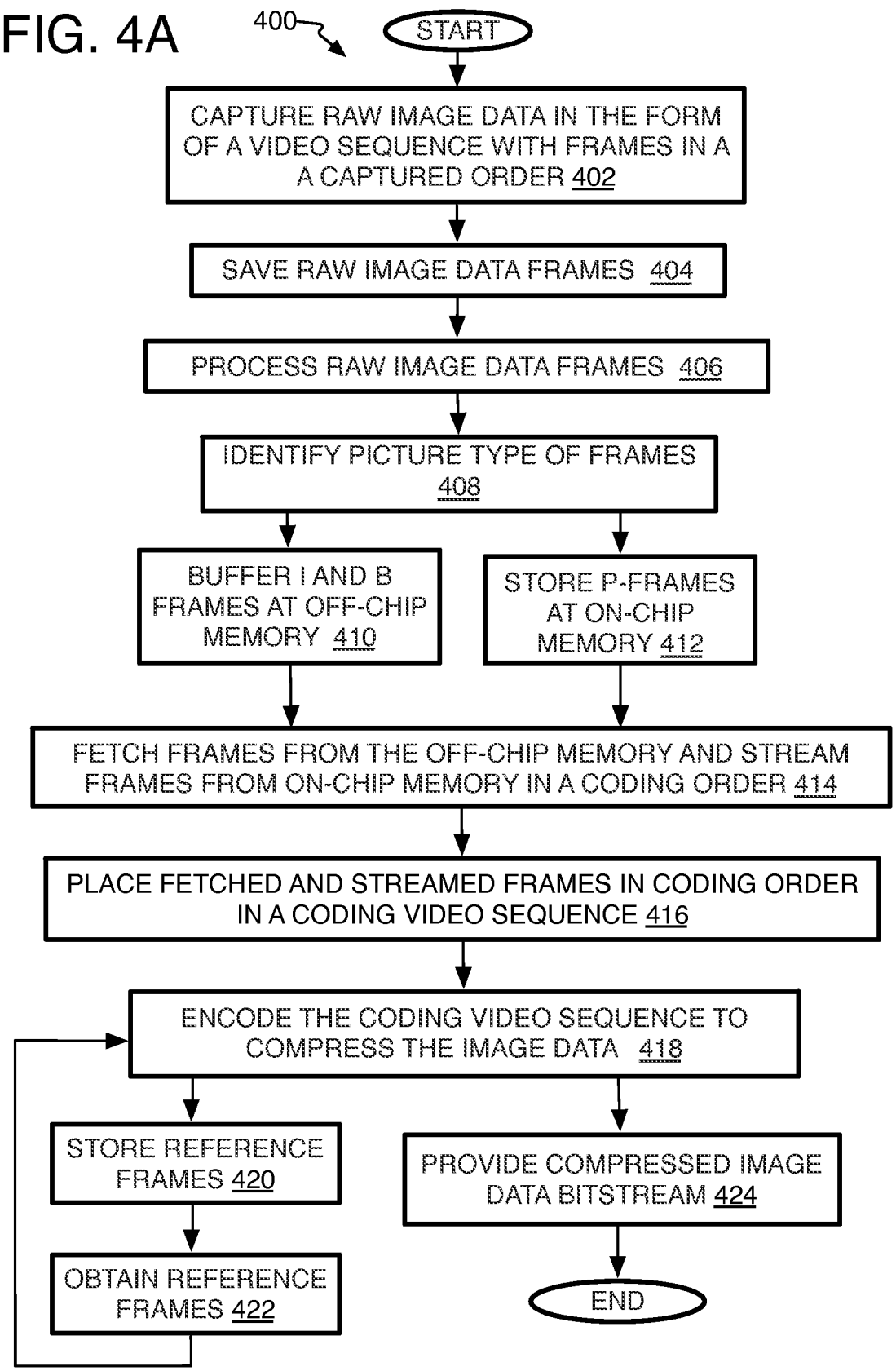
FIG. 4A is a detailed flow chart of an example method of frame re-ordering from a captured order to a coding order for video coding.

Referring now to FIG. 4A, a detailed example video coding process 400 is arranged in accordance with at least some implementations of the present disclosure. In the illustrated implementation, process 400 is a frame re-ordering process for video coding, and frame re-ordering from a capture order to an encode or coding order, and may include one or more operations, functions or actions as illustrated by one or more of operations 402 to 424 numbered evenly. By way of non-limiting example, process 400 will be described herein with reference to operations discussed with respect to FIGS. 1-2, 5-16, and 18, and may be discussed with reference to example systems 100, 200, 1000, 1200, 1400, 1600, or 1800 and timelines 500, 600, 700, and 800 discussed herein.

Process 400 may include "capture raw image data in the form of a video sequence with frames in a captured order" 402, and particularly, at least the chroma and luminance pixel values but may also include other overhead data necessary to reconstruct the frames and received from an image capture device such as a video camera or device with such a camera. The captured order refers to a chronological order as the camera captures the frames. This may be an IBBP order.

Process 400 may include "save raw image data frames" 404, such that the raw input frames may be saved on off-chip memory such as RAM or any other type of external memory whether volatile or non-volatile (where external here means off of the processor chip), or on-chip memory such as cache (or L2 cache) or other memory provided by an SOC or similar on-board circuitry.

Process 400 may include "process raw image data frames" 406. This operation may include a number of different pre-processing, post-processing, and frame construction operations at least sufficient so that the frames may be displayed by a display controller of a preview screen, and here sufficiently refined to be used by an encoder. This may be performed by an image signal processor (ISP) such as those shown on system 1800. The possible processing tasks are described below with operation 486 of process 480 (FIG. 8) directed to frame re-ordering from captured order to display order for a preview display. For coding, the raw image data frames should be pre-processed at least sufficient to be labeled as I, P, or B (or other types of frames depending on their use as, or use with, reference frames) for inter-prediction. This may or may not require refinement of color and/or luminance values for coding, display, and/or other purposes.

Process 400 then may include "identify picture type of frames" 408, and particularly to identify the I-frames to be intra-coded and to be used as reference frames, the prediction P-frames to be used as reference frames, and the bi-directional B-frames. It is understood that the B-frames could also be used as reference frames, and the processes herein may be adjusted for such a case. For the chronological capture order, this results in captured video sequences that may have an order with a group of pictures (GOP) as used by portable devices such as: $IP_1P_2P_3P_4$ . . . ; $IB_1P_1B_2P_2$ . . . ; or $IB_1B_2P_1B_3B_4P_2$ . . . to provide a few examples. The IBBP GOP will be used for all of the example implementations herein as the capture (and display) video sequence. The sub-script numbers refer to the order of the frame by picture type (I, B, or P). As mentioned above, the I frame has no reference frames, the P frame only uses the previous I-frame as a reference frame, and the I and P frames are both reference frames to the B-frames directly between the I and P frames.

Figure 5:
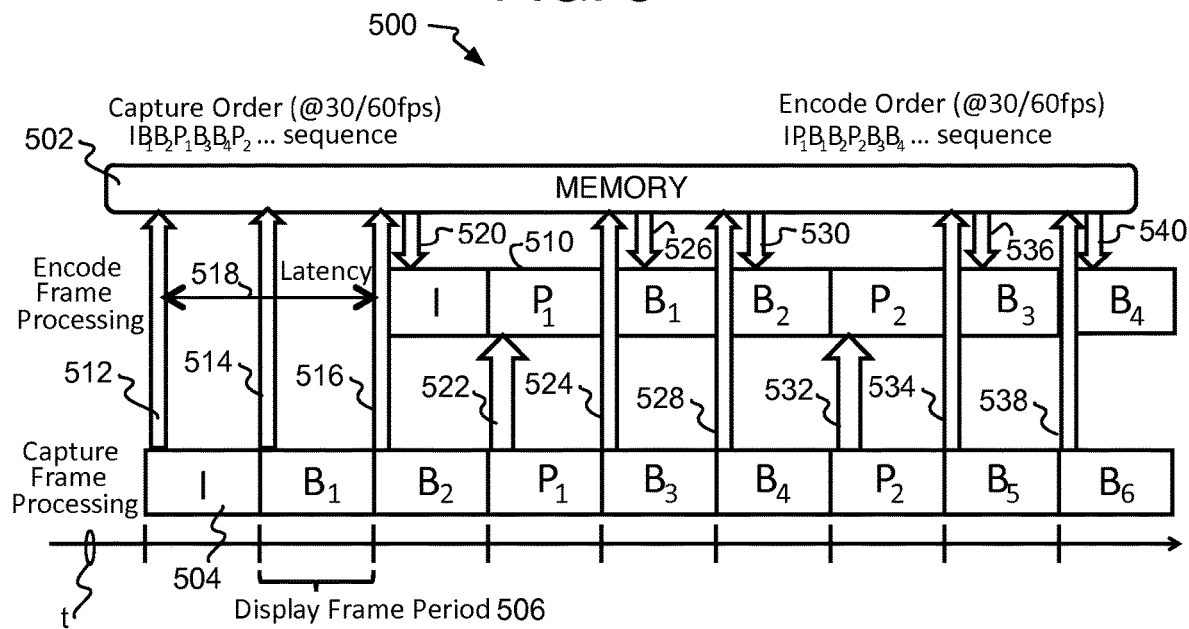
FIG. 5 is a schematic timeline diagram to explain frame re-ordering from captured frame order to encoder frame order according to the implementations herein.

Referring to FIG. 5, an example timeline chart (or just timeline) 500 is provided to assist with explanation of process 400 and that moves to the right as time progresses. Timeline 500 is provided to show an example of frame re-ordering from the capture order to the coding order where both capture and encoding frame sequences have the same frame rate and where the capture processing frame period covers the same amount of time as the coding processing period, and both of these are the same as a desired display frame period 506. For example, both capture and coding processing frame rate may be set at 30 fps, or both may be set at 60 fps. Thus, a memory 502, such as an off-chip memory or RAM is provided for storing some of the frames that are obtained from a capture video sequence 504 along a capture frame processing line and in a capture order as mentioned above ($IB_1B_2P_1B_3B_4P_2B_5B_6$ . . . ). The processing of each frame is shown to consume the equivalent of a display frame period 506 along the time line t, which may be based on the refresh rate of the target display or television (often 60 Hz or 120 Hz) that images are to be displayed on. Thus, the display frame period may be the time period to refresh a single frame. The display frame period may include the time to fetch a frame from memory and code or process the frame for display.

Process 400 may include "buffer I and B-frames at off-chip memory" 410, and particularly to save the I-frames and B-frames at off-chip memory 502 which may be volatile memory such as RAM, DRAN, DDR DRAM, and other types of RAM, or even may be a non-volatile memory whether disc-based or flash memory. Many other examples are possible. This operation is shown on the timeline 500 by arrows 512, 514, 516, 524, 528, 534, and 538 that lead from the capture video sequence 504 to the memory 502. I and B frames may be written to the memory (which also may be referred to as the DDR) 502 by the ISP or other processor(s).

Process 400 may include "store P-frames at on-chip memory" 412. The on-chip memory may be cache or other memory on the processor chip (or at the ISP) or other memory that is part of an SOC as mentioned above. This may be the same on-chip memory storing the raw input frames mentioned above. In this example, the P-frames are not written to the off-chip memory in order to save off-chip bandwidth. In this example, these buffered versions of the frames, both on-chip and off-chip, are those formed after at least raw data processing and identification of picture type (I, P, B, and so forth), and are ready for encoding. This may or may not include any extra pre-processing, refinement, or scaling of the image data of the frames that may occur before encoding. Other versions (where the frames are in different stages of processing) saved to on-chip memory are possible as described herein.

Process 400 may include "fetch frames from off-chip memory and stream frames from on-chip memory in a coding order" 414, and "place fetched frames in coding order in a coding video sequence" 416. These operations may be performed by the re-ordering unit (or streaming interface unit). The coding video sequence, such as the example coding video sequence 510 of timeline 500, may be constructed so that the reference frames are encoded before encoding the intermediate B-frame. Thus, in this example, the frames are fetched and streamed to re-order the frames and form the coding order $IP_1B_1B_2P_2B_3B_4$ . . . . This results in a video sequence that can be used to encode the $P_1$ frame before the $B_1$ and $B_2$ frames are encoded so that the $P_1$ frame may be one of the reference frames for the $B_1$ and $B_2$ frames.

The frames written to the off-chip memory are fetched so that the frame is placed into the correct and re-ordered location on the coding video sequence, and as shown by arrows 520, 526, 530, 536, and 540. The operations of streaming from on-chip memory (414) and then placing the frames in the coding video sequence (416) effectively may be referred to as directly streaming from the ISP (or other processor) to the coding video sequence or encoder, or it may be stated that the frames are directly streamed from the capture video sequence or on-chip memory. These frames are placed into the video coding sequence 510 without being written to the off-chip memory 502, and are represented by arrows 522 and 532 of timeline 500.

A latency 518 is intentionally placed into the frame re-ordering for this example so that the first frame of the coding video sequence 510 starts two frames (or two display frame periods) after the start of the processing (or writing to memory) of the capture video sequence 504. This is performed so that when the P-frames are streamed directly, the P-frames may be fetched from on-chip memory 502 and placed directly into the coding video sequence 510 at the same time or same display frame period as that of the processing at the $P_1$ frame in the capture video sequence 504. In other words, the latency 518 provides time-wise alignment of the P-frame positions in both the capture and coding video sequences even though the two video sequences have different orders. This results in lower off-chip memory bandwidth and a bandwidth savings that can be used for other tasks.

Figure 5A:
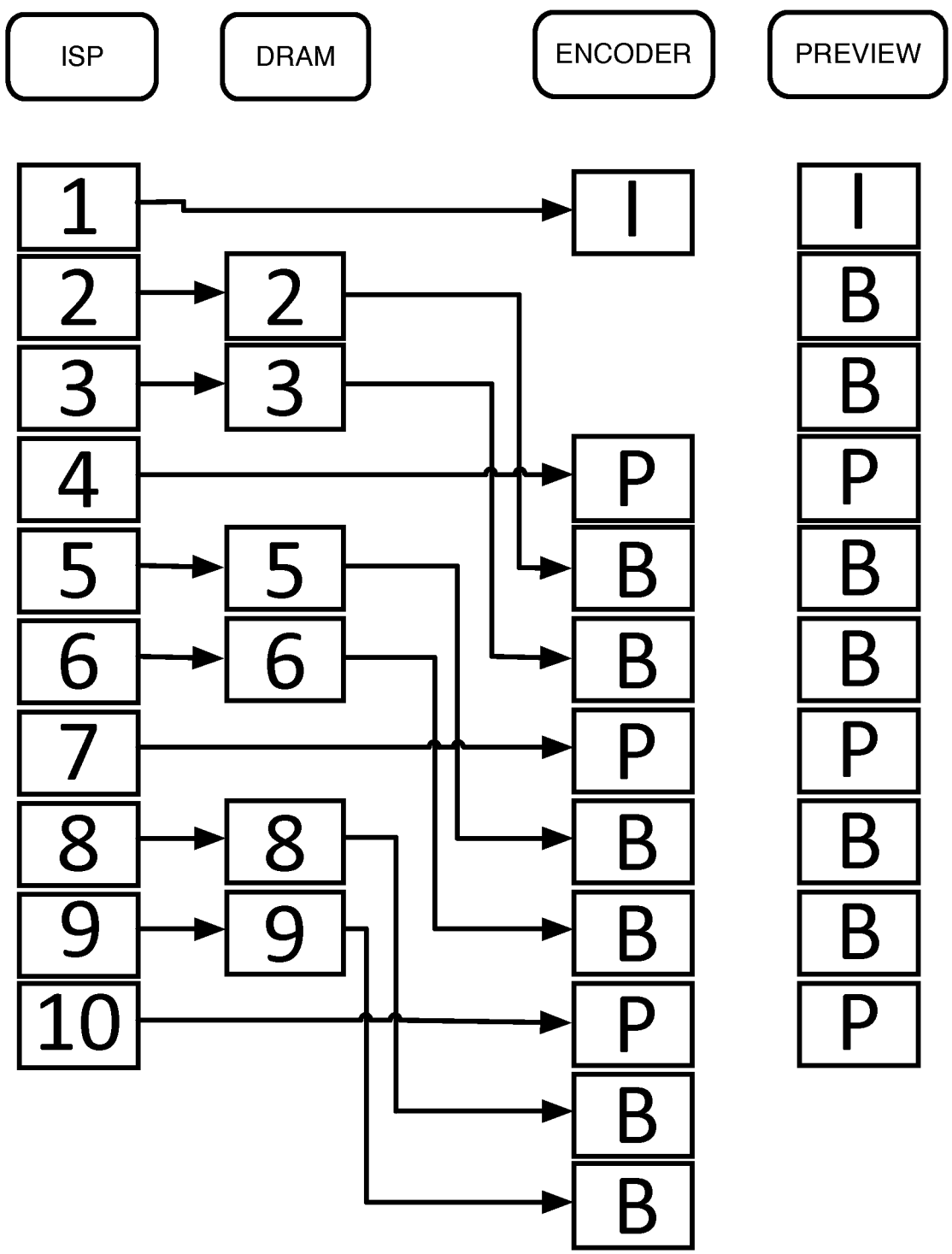
FIG. 5A is a schematic diagram to explain frame re-ordering among the image signal processor, RAM, encoder, and preview display.

Referring to FIG. 5A, another schematic diagram 501 is provided to show the streaming flow and timing between capture and coding or preview display. Thus, the ISP column shows frames 1 to 10 in capture order, while the DRAM column shows those frames written to temporary off-chip memory, which are then provided to the encoder as shown by the arrows and as fetched from off-chip memory. Those frames with arrows directly from the ISP column to the encoder column are directly streamed from the ISP (or on-chip memory). Alternatively, the frames are transmitted from the ISP to the preview column for display and the order in this case does not change. Another example of preview display with more details is provided for process 480 (FIG. 4D) and timeline 800.

Process 400 may include "encode the coding video sequence to compress the image data" 418, and as already described above with system 100. This operation may include the reconstructing of frames using inter-prediction to reconstruct B-frames by using the P-frames and I-frames, and sometimes reference B-frames as reference frames when provided.

Process 400 may include "store reference frames" 420, and particularly, store reconstructed frames that are to be used as the reference frames, which may include saving the frames in off-chip memory such as RAM, on-chip memory, or some other specific type of memory. The reference frames then may be obtained 422 and provided to the encoder as needed.

Otherwise, process 400 may include "provide compressed image data bitstream" 424, and specifically, to transmit the image data including frames in coding order to a device with a decoder, such as display device, or to storage.

The example of timeline 500 provides a system bandwidth savings compared to a system writing all frames to off-chip memory and for NV12 ultra high definition (UHD) p60 content=3840×2160×1.5×2×20=475 MB/s that is not used due to streaming the P-frames, where 3840×2160 is the pixel count of a screen, 1.5 is for the down sampling of the color components in the packing format of NV12, 2 is for writing once to off-chip memory and then fetching from off-chip memory for each P-frame that is omitted from off-chip memory by using the present bandwidth saving methods, and 20 is the frames per second used for the test.

By a modification of process 400, instead of a coding order, the capture video sequence may be re-ordered to a display order to view the frames on a preview screen such as those on digital cameras. Another way to state this alternative is that it performs frame-reordering from the ISP to display (preview). In this case, frames of all picture types (I, P, and B) may be streamed to the display video sequence in the display order (and which need not be changed from capture order). The display order is the ISP output order resulting from the processing of the raw image data (such as with operation 406 above or 486 below). The system bandwidth savings compared to providing all frames to off-chip memory and for NV12 UHDp60 content=3840×2160×1.5×2×60=1425 MB/s.

Figure 4B:
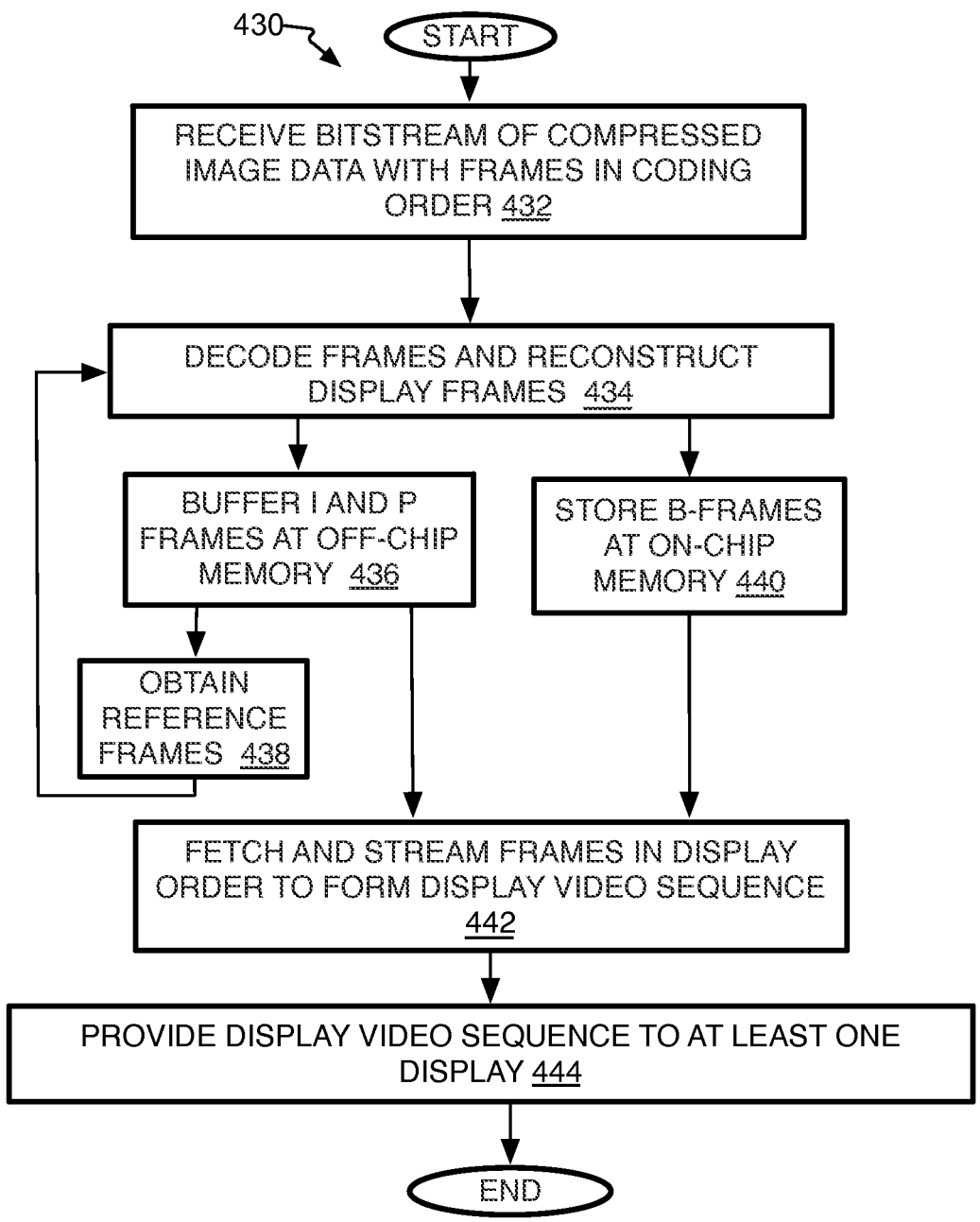
FIG. 4B is a detailed flow chart of an example method of frame re-ordering from a coding order to a display order for video coding.

Referring now to FIG. 4B, a detailed example video coding process 430 is arranged in accordance with at least some implementations of the present disclosure. In the illustrated implementation, process 430 is a frame re-ordering process for video coding, and particularly for re-ordering from a decoding (or coding) order to a display order also referred to as video playback, and may include one or more operations, functions or actions as illustrated by one or more of operations 432 to 444 numbered evenly. By way of non-limiting example, process 430 may be described herein with reference to operations discussed with respect to FIGS. 1-2, 5-16, and 18, and may be discussed with reference to example systems 100, 200, 1000, 1200, 1400, 1600, or 1800 herein.

Process 430 may include "receive bitstream of compressed image data with frames in coding order" 432. This operation covers receipt of a bitstream already compressed by an encoder and accessible for decoding. The bitstream may include entropy encoded transform and quantized coefficients along with motion vectors and any other header data. By one form, the image data may include frames (and actually data to re-construct the frames) in coding order such as IPBBPBB . . . .

Process 430 may include "decode frames and reconstruct display frames" 434, and decode the coding video sequence by using the image data from the bitstream to reconstruct the frames, and by operations already explained with decoder 200. The decoding operation may reconstruct frames using intra-coding and inter-prediction that uses reference frames as explained above. Thus, process 430 may include "buffer I and P-frames at off-chip memory" 436, and particularly to buffer the reference frames for the inter-prediction. The decoder then may "obtain reference frames" 438 from the off-chip memory as needed to use to reconstruct other frames. The decoder output than may be provided in the order of $IP_1B_1B_2P_2B_3B_4$ . . . , and hence, needing to be re-ordered before it can be displayed.

Figure 6:
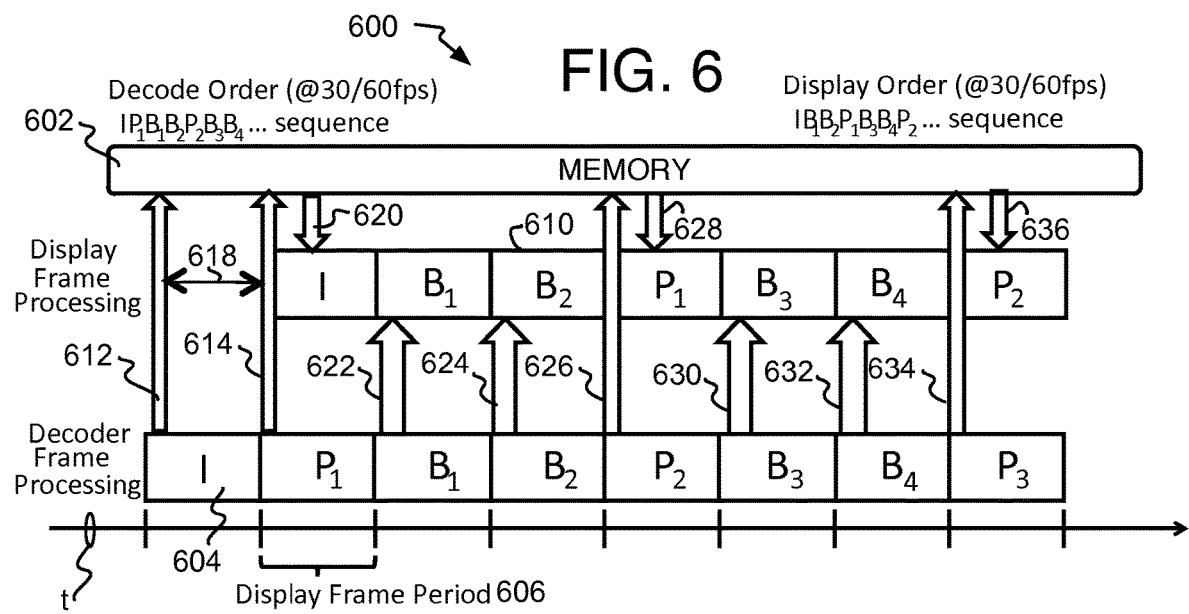
FIG. 6 is a schematic timeline diagram to explain frame re-ordering from decoder frame order to display frame order according to the implementations herein.

Referring to FIG. 6, an example timeline chart (or just timeline) 600 is provided to assist with explanation of process 430 and that moves to the right as time progresses. Timeline 600 is provided to show an example of frame re-ordering from the coding order to the display order where both decoding frame sequences and display frame sequences are set for the same display frame rate such as both are set at 30 fps or both are set at 60 fps. Thus, a memory 602, such as an off-chip memory or RAM is provided for storing some of the frames that are obtained from a coding video sequence 604 along a coding frame processing line and in a coding order as mentioned above ($IP_1B_1B_2$ $P_2B_3B_4P_3$ . . . ) for example. The processing of each frame is shown to fill a display frame period 606 along the time line t. The frames, and in this example the I and P-frames, are written to the off-chip memory as shown by arrows 612, 614, 626, and 634, and are subsequently fetched so that the frame is placed into the correct and re-ordered location on the display video sequence 610.

To save off-chip memory bandwidth, process 430 may include "store B-frames at on-chip memory" 440, and in this example, without writing the B-frames to the off-chip memory. In this example, these buffered versions of the frames, both on-chip and off-chip, are those formed that are at least already decoded and ready for display. This may or may not include any post-processing such as enhancements, refinement, or scaling of the image data of the frames. Other versions (where the frames are in different stages of processing) are possible as described herein.

Process 430 may include "fetch and stream frames in display order to form display video sequence" 442, and particularly for this example, fetch the I-frames and P-frames from the off-chip memory as shown by arrows 620, 628, and 636, and stream the B-frames from the on-chip memory as represented by arrows 622, 624, 630, and 632 of timeline 600. The operations of streaming from on-chip memory (440) and then placing the frames in the coding video sequence (442) effectively may be referred to as directly streaming from the ISP (or other processor) or decoder to the display video sequence, or it may be stated that the frames are directly streamed from the coding video sequence (but more precisely from the on-chip memory). These frames are placed into the display video sequence 610 without being written to the off-chip memory 602, which reduces off-chip memory bandwidth. The resulting display order may be $IB_1B_2P_1B_3B_4P_2$ . . . .

A latency 618, similar to latency 518, is built into the process except here it is a one period latency, and provided so that the B-frames in both the coding video sequence 604 and the display video sequence 610 align in the same display frame periods 606. Thus, $B_1$ in the coding video sequence 604 is in the same display frame period 606 as $B_1$ in the display video sequence 610, and so forth.

Process 430 may include "provide display video sequence to at least one display" 444, and where the display video sequence now has the frames in IBBP display order. The system off-chip memory bandwidth savings, compared to a conventional system that saves all frames to off-chip memory, for NV12 UHDp60 content=3840×2160×1.5×2× 40=949 MB/s.

Figure 4C:
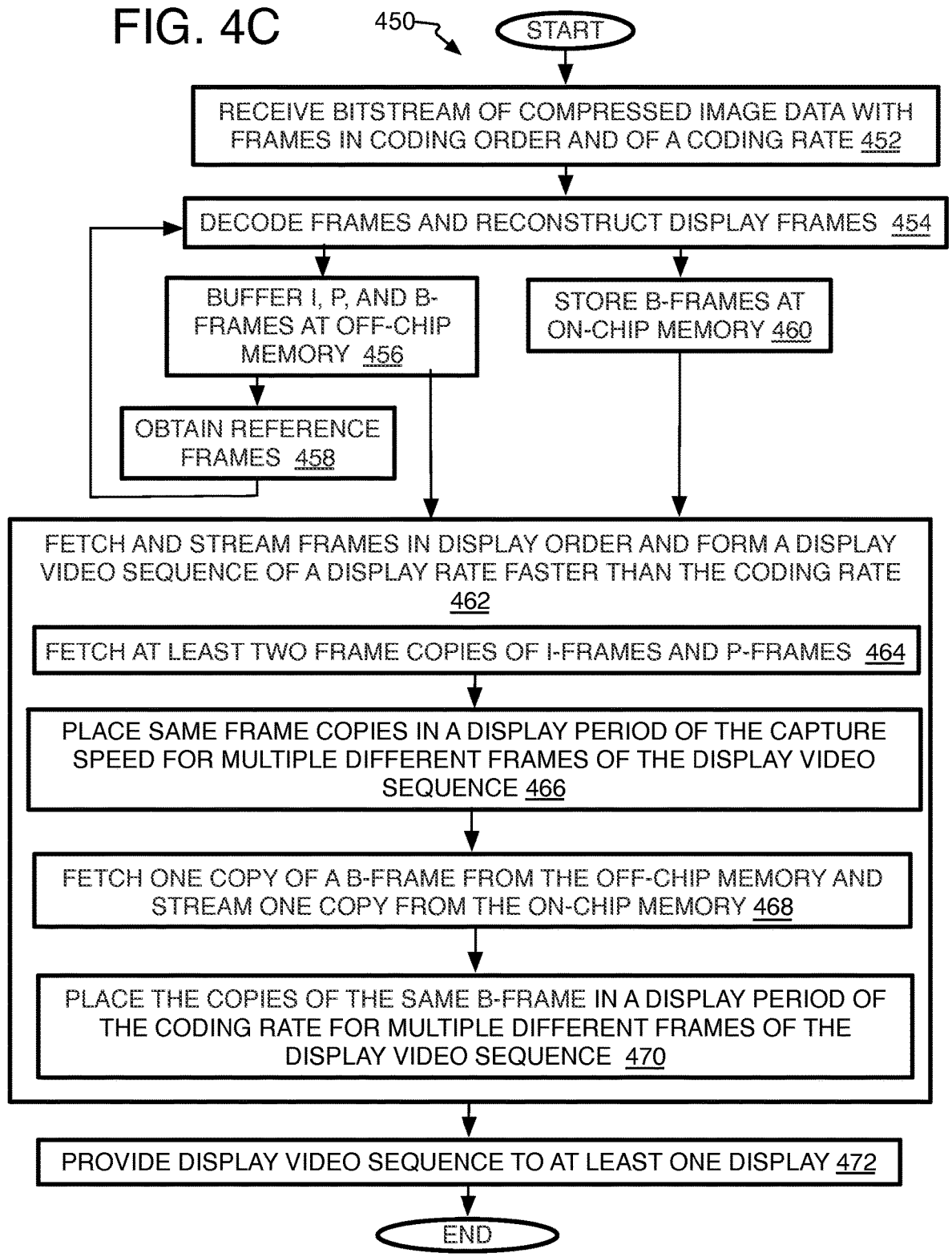
FIG. 4C is a detailed flow chart of an example method of frame re-ordering from a coding order to a display order for video coding while changing to a video display frame rate.

Referring now to FIG. 4C, a detailed example video coding process 450 is arranged in accordance with at least some implementations of the present disclosure. In the illustrated implementation, process 450 is a frame re-ordering process for video coding, and particularly for re-ordering frames from a decoding (or coding) order to a display order, or playback, and for a display video sequence with a different display rate than that of the decoding rate for the coded video sequence. The present illustrated example explains the process 450 with a display rate two times the decode rate. Process 450 may include one or more operations, functions or actions as illustrated by one or more of operations 452 to 472 numbered evenly. By way of non-limiting example, process 450 will be described herein with reference to operations discussed with respect to FIGS. 1-2, 5-16, and 18, and may be discussed with reference to example systems 100, 200, 1000, 1200, 1400, 1600, or 1800 discussed herein.

Since process 450 is directed to playback and then display, as with process 430, the operations of "receive bitstream of compressed image data with frames in coding order and of a coding rate" 452, "decode frames and reconstruct display frames" 454, and "obtain reference frames" 458 are the same or similar to that described with process 430 and do not need further explanation, except here the coding rate (or in other words, the frame rate) also is noted.

Process 450, however, may include "buffer I, P, and B-frames at off-chip memory" 456 which is different from that of process 430. Here, by one example, all frame types are buffered to off-chip memory, and by one example, all frames are buffered to off-chip memory.

Referring to FIG. 7, an example timeline chart (or just timeline) 700 is provided to assist with explanation of process 450 and that moves to the right as time progresses. Timeline 700 is provided to show an example of frame re-ordering from the coding order of a coding video sequence with a coding rate and a display order of a display video sequence of a display rate different from the coding rate. Here, the coding video sequence has a decoding rate of 30 fps and a display video sequence is associated with a display rate of 60 fps. Thus, a memory 702, such as an off-chip memory or RAM is provided for storing some of the frames that are obtained from a coding video sequence 704 along a coding frame processing line 704, and in a coding order as mentioned above ($IP_1B_1B_2$ $P_2B_3B_4P_3$ . . . ) for example. The processing of each frame at the coding video sequence 704 is shown to fill a display frame period 706 along the time line t. The frames, and in this example the I and P-frames, are written to the off-chip memory as shown by arrows 712, 714, 720, 726, 732, 738, 744, and 750, and are subsequently fetched so that the frame is placed into the correct and re-ordered location on the display video sequence 610.

Process 450 may include "store B-frames at on-chip memory" 460, and as the on-chip memory has been described above. This results in two copies of the B-frames being buffered with one copy stored on the on-chip memory and the other copy stored on the off-chip memory so that the process buffers two copies of the same B-frame, and in one example, each of the B-frames. In this example, these buffered versions of the frames, both on-chip and off-chip, are those formed that are at least already decoded and ready for display. This may or may not include any post-processing such as enhancements, refinement, or scaling of the image data of the frames. Other versions (where the frames are in different stages of processing) are possible as described herein.

Process 450 may include "fetch and stream frames in display order and form a display video sequence of a display rate faster than the coding rate" 462. In order to convert from a coding processing rate to a faster display rate, multiple copies of the same frame may be placed in a display frame period of the slower rate when the faster display rate is a multiple of the slower rate such as here where the decoding rate is 30 fps and the display rate is 60 fps where 60/30=2 as a rate factor. In this case, two copies of each frame are fetched where the factor of the faster display rate is the number of phases and the number of frames of the faster rate that fills a single display frame period of the slower rate. The display order after such a frame rate conversion where the display rate is two times the coding rate (the factor is 2) may result in the order $IIB_1B_1B_2B_2P_1P_1B_3B_3B_4B_4P_2P_2$ . . . by one example form. The phases 701 and 703 of the display frame periods 706 are filled along the display video sequence 710 from left to right in chronological order as shown on timeline 700 even though the operations below discuss fetching and insertion of the I, P, and B frames separately.

The video sequence is initiated after a latency 717 similar to latency 518 of timeline 500 in order to align the B-frame slots of the display frame period 706 of the coding video sequence 704 with the B-frame display frame periods of the display video sequence 710. Thus, process 450 may include "fetch at least two frame copies of I-frames and P-frames" 464 as shown by arrows 716, 718, 734, 736, and 752, 754 on timeline 700. Then, process 450 may include "place same frame copies in a display period of the coding rate for multiple different frames of the display video sequence" 766 resulting in II or PP order in the display video sequence 710.

Process 450 may include "fetch one copy of a B-frame from the off-chip memory and one copy from the on-chip memory" 468, and in order to reduce the off-chip memory bandwidth. Thus, the fetching of the B-frames from the off-chip memory 702 may be represented by arrows 724, 730, 742, and 748, and the direct streaming of the B-frames from the ISP (or from on-chip memory) to the video sequence 710 may be represented by arrows 722, 728, 732, 740, and 746 of timeline 700.

Process 450 may include "place the copies of the same B-frame in a display period of the coding rate for multiple different frames of the display video sequence" 470, and particularly, place one frame in a first phase 701 and another frame in a second phase 703, where the number of phases (and display frames) for a single display frame period is equal to the rate factor as explained above. By one example, the streamed B-frame copy from the on-chip memory is placed in the $1^{st}$ phase of the display frame period, while the B-frame copy from the off-chip memory is placed in $2^{nd}$ phase and for each display frame period. This may be consistent for an entire video sequence or just parts of a sequence such as certain scenes or parts of scenes, or for all such video processing by a device.

Note that this frame rate conversion performed by streaming can be used when the display does not have its own frame buffer to perform the conversion. Thus, a display controller with its own frame buffer such as a display panel self-refresh (DSR) or panel self-refresh (PSR) functionality may perform the modification of the bitstream to change the display rate instead.

Process 450 may include "provide display video sequence to at least one display" 472, and as already described above.

For the scenario that uses DSR/PSR options, the system bandwidth savings for NV12 UHDp30 content=3840×2160×1.5×30=356 MB/s. The streaming option, however, still provides bandwidth savings over storing all frames at off-chip memory reaching system bandwidth savings for NV12 UHDp60 content=3840×2160×1.5×20=237 MB/s. A similar process can be applied for 24 fps video input (capture frame rate).

Referring now to FIG. 4D, a detailed example video coding process 480 is arranged in accordance with at least some implementations of the present disclosure. In the illustrated implementation, process 480 is a frame re-ordering process for video coding, and particularly for re-ordering frames from a decoding (or coding) order to a display order and for a display video sequence with a different rate than the capture rate, and may include one or more operations, functions or actions as illustrated by one or more of operations 482 to 496 numbered evenly. By way of non-limiting example, process 480 will be described herein with reference to operations discussed with respect to FIGS. 1-2, 5-16, and 18, and may be discussed with reference to example systems 100, 200, 1000, 1200, 1400, 1600, or 1800, or timelines 500, 600, 700, or 800 as discussed herein.

Process 480 may include "capture raw image data in the form of a video sequence with frames in a captured order and of a capture rate" 482, and particularly, at least the chroma and luminance pixel values received from an image capture device such as a video camera. The captured order refers to a chronological order as already explained above. In this example, the capture rate is 30 fps.

Process 480 may include "save raw image data frames" 484, such that the frames may be saved on off-chip memory (such as RAM) or on-chip memory (such as SOC module of L2 cache (ML2)).

Process 480 may include "process raw image data frames" 486, and particularly, may include pre-processing of the RAW data such as noise reduction, pixel linearization, and shading compensation. It also may include resolution reduction, Bayer demosaic, and/or vignette elimination, temporal de-noising, image sharpening, and so forth. Once pre-processed, general image statistics information may be calculated. This may include luminance/chrominance values and averages, luminance/chrominance high frequency and texture content, motion content from frame-to-frame, any other color content values, picture statistical data regarding deblocking control (for example, information controlling deblocking/non-deblocking), RGBs grid, filter response grid, and RGB histograms to name a few examples. This information may be provided on a macroblock or coding unit (CU) basis (for example, per 16×16, or 8×8, or other size block of pixels), or may be provided per pixel, or other unit basis as desired depending on compatibility parameters for certain coding standards. decoding rate is Once pre-processed and statistics are collected, automatic white balance (AWB) or other adjustments related to automatic focus (AF) or automatic exposure control (AEC) may be applied for further image capturing as well, and the ISP processes each frame-by-frame data to reconstruct the frame with adjustments from pre-processing and the statistics.

Post-processing then may occur and include CFA (Color Filter Array) interpolation, color space conversion, (such as raw RGB to sRGB where not performed already, for example), gamma correction, RGB to YUV conversion, image sharpening, and so on. The raw data processing may be performed by a processor such as the ISP or other processor mentioned herein, for performing these processes by software and/or the ISP's hardware pipelines.

Process 480 may include "buffer I, P, and B-frames at off-chip memory" 488, and to off-chip temporary memory such as RAM and as explained with any of the similar features described above. In this case, however, all frame types are written to off-chip memory, and by one example, all frames are written to off-chip memory.

Referring to FIG. 8, an example timeline chart (or just timeline) 800 is provided to assist with explanation of process 480 and that moves to the right as time progresses. Timeline 800 is provided to show an example of frame re-ordering from the capture order of a captured video sequence with one display rate and a preview display order of display video sequence of a different display rate. Such a capture frame rate may be 30 fps for a capture video sequence while the display video sequence maybe associated with a display rate of 60 fps. Thus, a memory 802, such as an off-chip memory or RAM is provided for storing the frames that are obtained from a capture video sequence 804 along a capture frame processing line b04, and in a coding order as mentioned above ($IP_1B_1B_2P_2B_3B_4P_3$ . . . ) for example. The processing of each frame at the capture video sequence 804 is shown to fill a display frame period 806 along the time line t. In the present example, arrows 812, 818, 824, 830, 836, 842, 848, and 854 on timeline 800 represent the buffering of the frames to off-chip memory.

Process 480 may include "store I, P, and B-frames at on-chip memory" 490. Thus, individual frames are written or buffered to both off-chip and on-chip memory. By one form, all frames are copied to both memories. The storage to on-chip memory is not shown on timeline 800 since it is may be considered as direct streaming from the capture video sequence (or ISP) instead. In this example, these buffered versions of the frames, both on-chip and off-chip, are those formed immediately from raw data processing before coding processing (before encoding intermediate or final versions). Other versions (where the frames are in different stages of processing) are possible consistent to the parameters described herein.

Process 480 may include "fetch the same frame copy from both memories for multiple different frames" 492, and particularly, fetch one frame copy from on-chip memory and another frame copy from off-chip memory of the same frame. This is performed for all frame types, I, P, B, and so forth. The frames copies directly streamed from on-chip memory and to the display video sequence 810 are represented by arrows 814, 820, 826, 832, 838, 844, 850, 856. The frame copies fetched from off-chip memory are represented by arrows 816, 822, 828, 834, 840, 846, 852, and 858.

Process 480 may include "place same frame copies in a display period of the capture rate for multiple different frames to form display video sequence of a display rate faster than the capture rate" 494. Specifically, the streamed frame copies from on-chip memory are placed in phase 1 (801) of each display frame period 806, while the frame copies fetched from off-chip memory 802 are placed in the $2^{nd}$ phase (803) of the display frame periods 806. It will be understood this may be switched or other arrangements may be used when there are more than two frames to place in a single display frame period.

Process 480 may include "provide display video sequence to at least one display" 496. Thus, the processed video images may be displayed whether as a view-finder or preview image on a digital camera or phone screen, or a final display on another device, or may be stored for later viewing. Alternatively, or additionally, the image data may be provided to an encoder for compression and transmission to another display with decoding or to a storage device.

The system bandwidth savings for NV12UHDp60 content=3840×2160×1.5×20=356 MB/s compared to a system that saves and fetches all frames from off-chip memory.

Referring to FIGS. 9-16, existing implementations are provided for comparison to detailed implementations of systems that may be used to perform the methods to reduce off-chip bandwidth by using direct streaming of certain frames for frame re-ordering as described herein. Many of the implementations have the same or similar components. Thus, one component labeled similarly on one implementation may be the same or similar to a component with a similar label on another implementation. In these cases, re-describing the components is unnecessary. The different implementations using the direct streaming of frames cover solutions with regard to reducing off-chip memory bandwidth for different media usages.

Figure 9:
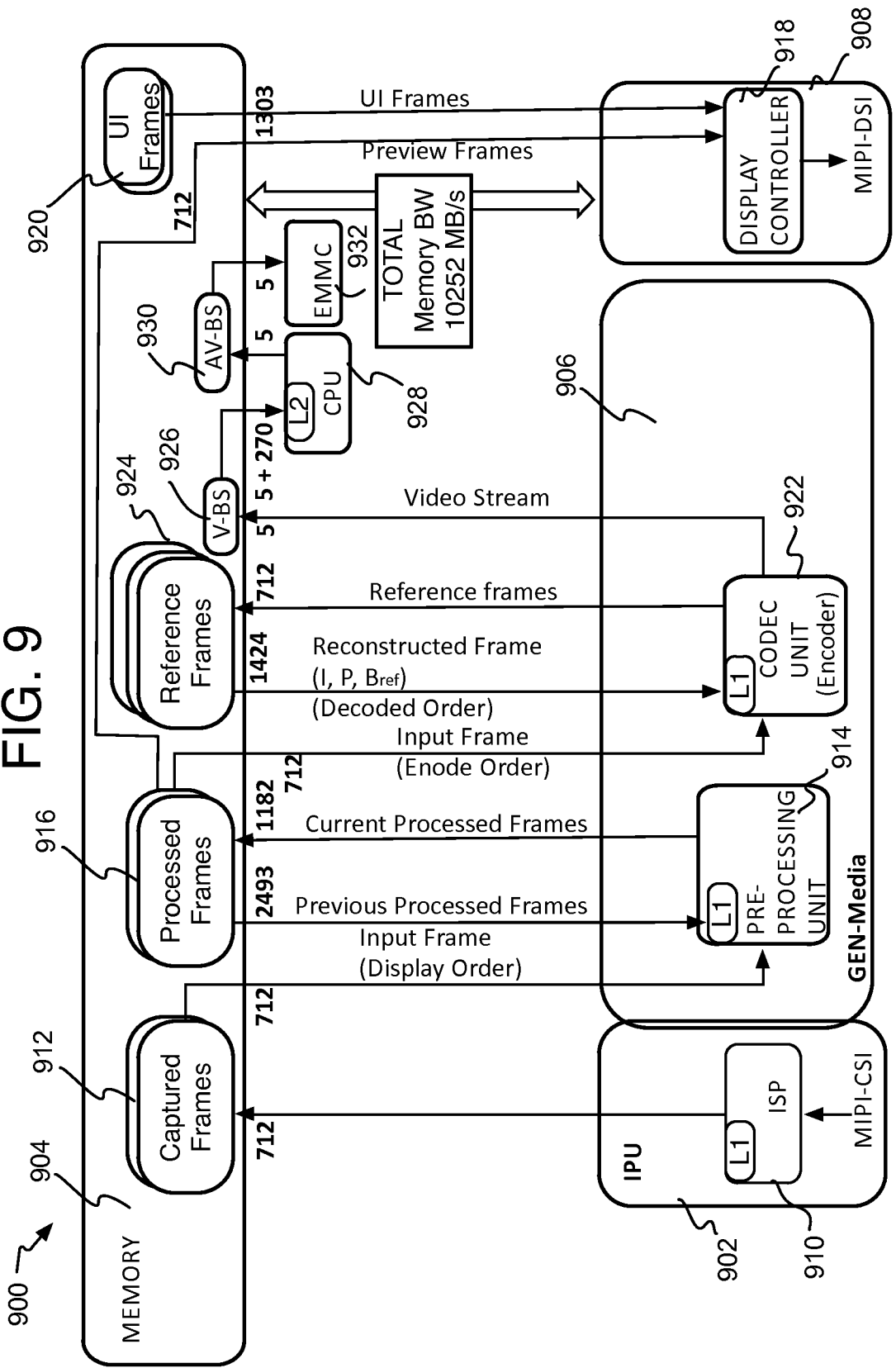
FIG. 9 is an illustrative diagram of an existing video coding system for recording and preview display.

Referring to FIG. 9, a system 900 is a conventional implementation which does not support streaming between IPU-ISP (Imaging) and codec unit (video encoder) during video record. The system 900 may have an image processing unit (IPU) 902 to capture images, such as a digital camera, and for recording and preview display both with a 4 k screen at 60 fps (4k60). The IPU 902 may store images on an off-chip temporary memory 904 such as a RAM, and may use the memory 904 for storing frames or images at a number of different processing stages, and while a general media unit 906 encodes the image data for placement in a bitstream for transmission to a decoder through an embedded multi-media controller (EMMC 932 described in detail below) or that provides a display unit 908 to view the frames on a preview screen.

Specifically, the IPU 902 may use mobile industry processor interface (MIPI) standards for camera serial interface (CSI) functions to capture video image data as one possible example. The processing may be performed by an ISP 910 with L1 cache to hold image data. After raw data processing, the captured frames 912 may be stored on the memory 904. By one alternative, a post and pre-processing unit 914 is provided. This unit may be referred to as just a pre-processing unit or a post-processing unit depending on the position of this unit relative to the codec unit—and this is the same for all such post and pre-processing units disclosed herein. The pre-processing unit 914 is provided with an L1 cache to further modify and refine the image data for color sharpness or other post-processing operations then may obtain the frames in display order. Current processed frames 916 are written to the memory 904 and previous frames may be fetched by the pre-processing unit when such previous frame data is needed to enhance a current frame. Thereafter, the processed frames may be provided to a display controller 918 at the display unit, and along with user interface (UI) frames that provide an environment or screen with the menu for a user to control the display of the image for viewing the video frames and to provide a video sequence for display. In one form, MIPI display serial interface (DSI) standards may be used.

Otherwise, the processed frames 916 may be provided to a codec unit 922 that may be an encoder and that stores reconstructed reference frames 924 and then fetches the frames, whether I, P, or B reference frames) when needed to reconstruct a current frame and to place the frames in coding order as needed. The resulting video bit stream (V-BS) 926 is stored on the memory 904 with all frames, and then is provided to a CPU 928 with L2 cache to reconstruct the entire audio-video bitstream (AV-BS) 930 also stored on the memory 904. The final bitstream is provided to the EMMC for use or transmission to a decoder.

Embedded Multi-Media Controller (EMMC or eMMC) refers to a package consisting of both flash memory and a flash memory controller integrated on the same silicon die. The EMMC solution consists of at least three components: the MMC (multimedia card) interface, the flash memory, and the flash memory controller. The EMMC is offered in an industry-standard BGA package. EMMC was developed as a standardized method for bundling the controller into the flash die. This may include provisions for features such as secure erase and trim and high-priority interrupt to meet the demand for high performance and security as well as others. The EMMC controller may direct the transmission of the bitstream to other devices with decoders and displays.

This conventional system 900 provides a total off-chip memory bandwidth of 10252 MB/s as shown by the numbers along the in (or writing) and out (or fetching) transmissions to and from the memory 904.

Figure 10:
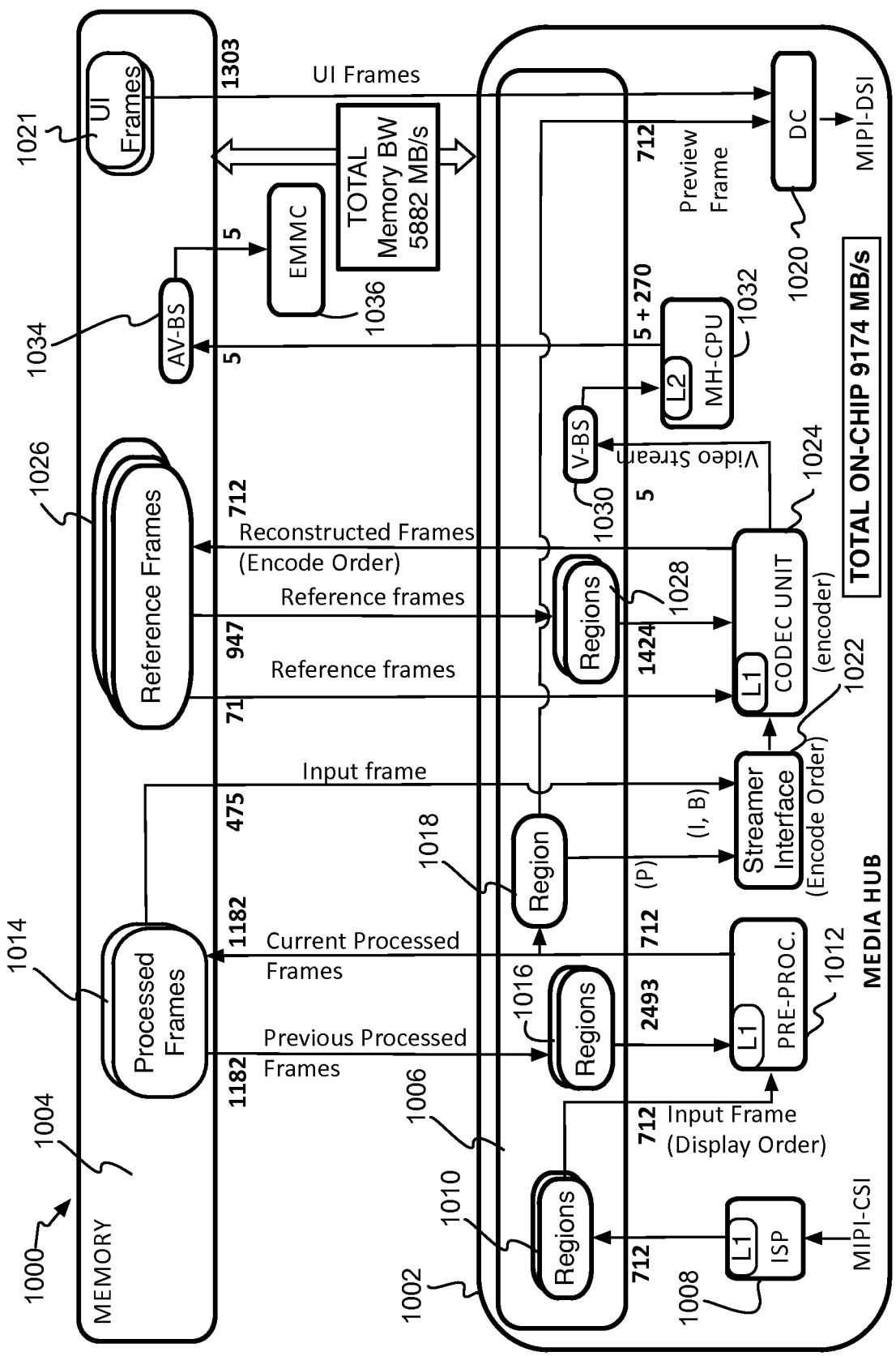
FIG. 10 is an illustrative diagram of an example video coding system for recording and preview display according to one of the frame re-ordering implementations herein.

Referring to FIG. 10, an example is provided that supports streaming between IPU-ISP (Imaging) and a codec unit (video encoder) during video record. Both recording and coding and display are provide for a 4k60 screen. This example may implement process 400 (FIG. 4A) and timeline 500. System 1000 has a media hub 1002 with an internal or on-chip memory such as a module of L2 cache (ML2) (also referred to herein as internal or local memory), where the media hub or at least parts of the media hub are formed by one or more SOCs or similar structures. An off-chip memory 1004 such as those described herein also may be used. The system 1000 uses an ISP 1008 similar to ISP 910 described above, except here the capture frames (labeled regions) 1010 are written to the on-chip memory 1006. The frames stored at on-chip memory are called regions because the frames still may be stored a region of an image at a time rather than the entire image when memory capacity does not allow for it. The capture frames are provided as input frames in display (or capture) order (IBBP as one example), and by one form to a post and pre-processing unit 1012 similar to pre-processing unit 914 except here previously processed frames 1014 may first be fetched and placed in on-chip memory (regions or cache) 1016 before being provided to the pre-processing unit 1012. A copy of all of the processed frames may be placed in on-chip memory region 1018. These processed frames, with enhancements from the pre-processing unit 1012 along with UI frames 1021 then may be provided to a display controller 1020 that uses MIPI-DSI to preview display the video without frame re-ordering and coding as described herein.

Otherwise, a streamer interface (or re-ordering unit) 1022 may stream P-frames from the local on-chip region 1018 as well as fetch the I and B-frames from the off-chip memory 1004 to construct a coding video sequence with the frames in a coding order (IPBB as with example timeline 500). This coding video sequence is then provided to a codec unit (encoder) 1024. During coding, the codec unit may generate reconstructed frames to be used as reference frames 1026 and that are stored in off-chip memory 1004. Some of the frames from the off-chip memory 1026 are then placed in an L2 cache region 1028 to reduce fetches straight from memory 1004, but that are retrieved directly from the reference frames 1026 on memory 1004 with a cache miss. The resulting video bitstream V-BS 1030 may be saved to the on-chip memory 1006 and then provided to a media hub CPU (MH-CPU) with L2 cache to construct the entire audio-video bitstream (AV-BS) 1034 which then may be stored on off-chip memory 1004 before being provided to the EMMC as described above.

The total off-chip memory bandwidth is 5882 MB/S, which is about 43% less bandwidth compared to that of the system 900, and the total on-chip memory bandwidth is 9174 MB/s. Even though the total bandwidth is greater for streaming system 1000 than system 900, system 1000 is still more efficient to leave more bandwidth capacity of the off-chip memory for other uses. This is the similar conclusion for all of the systems described herein.

Figure 11:
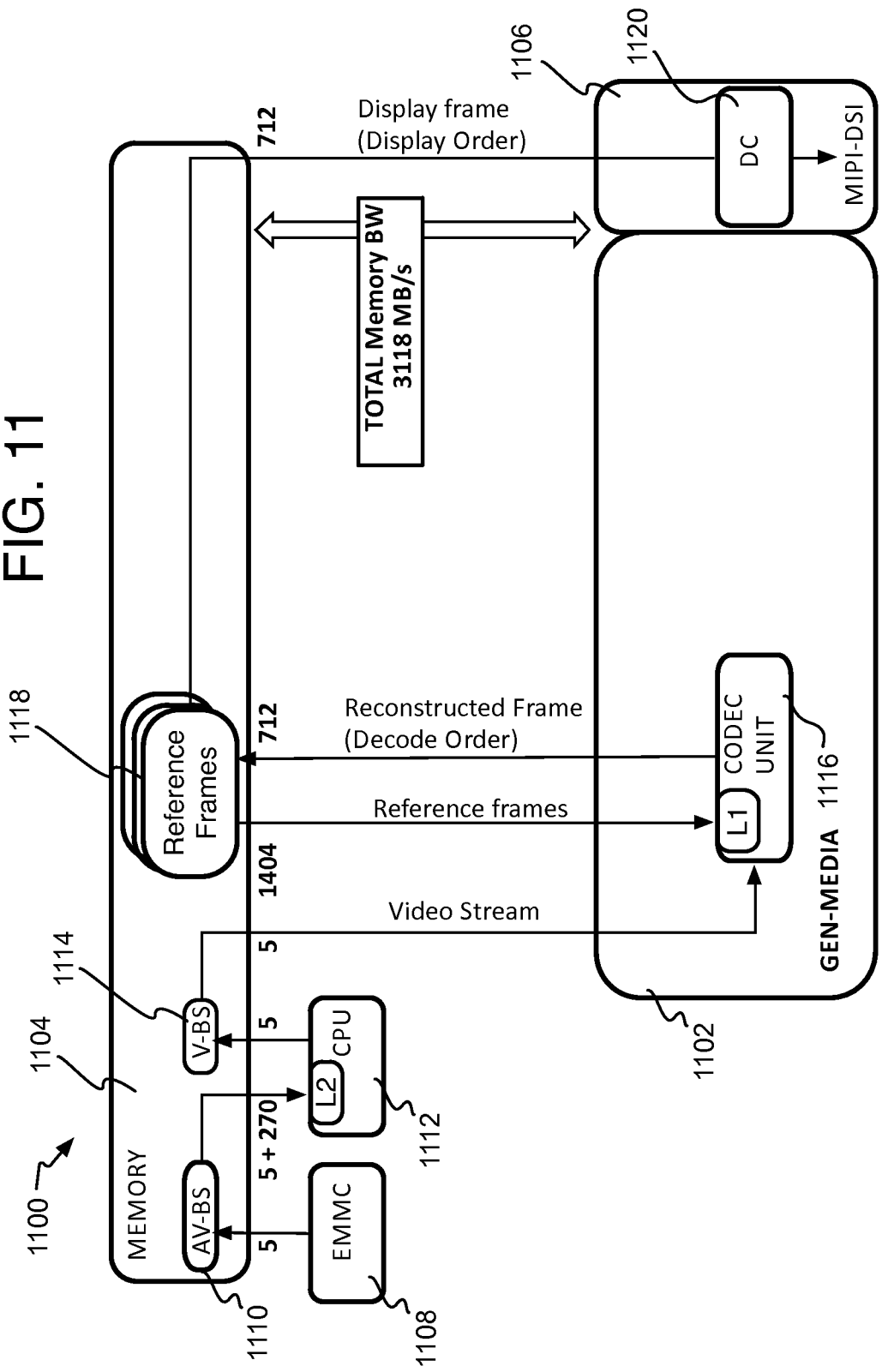
FIG. 11 is an illustrative diagram of an existing video coding system during playback and display.

Referring to FIG. 11, another conventional implementation is provided for decoding and that does not support streaming between codec unit (video decoder) and display controller during video playback. Here, a system 1100 has a general media unit 1102 and an off-chip or external temporary memory 1104 as well as a display unit 1106. An EMMC 1108 provides a bitstream (AV-BS) 1110 of coded image data that is written to memory 1104 and then provided to a CPU 1112 to separate the video from the audio, and provide the video bitstream (V-BS) 1114 to a decoder (codec unit) 1116. The decoder 1116 saves the reconstructed frames 1118 including reference frames on memory 1104 and fetches the reference frames 1118 as needed and to form a coding video sequence in coding order and to be decoded. The reconstructed frames are then provided to a display controller 1120 at the display unit 1106 for display and by one example, by using a MIPI-DSI standard. Such a system 1100 uses 3118 MB/s total off-chip memory bandwidth.

Figure 12:
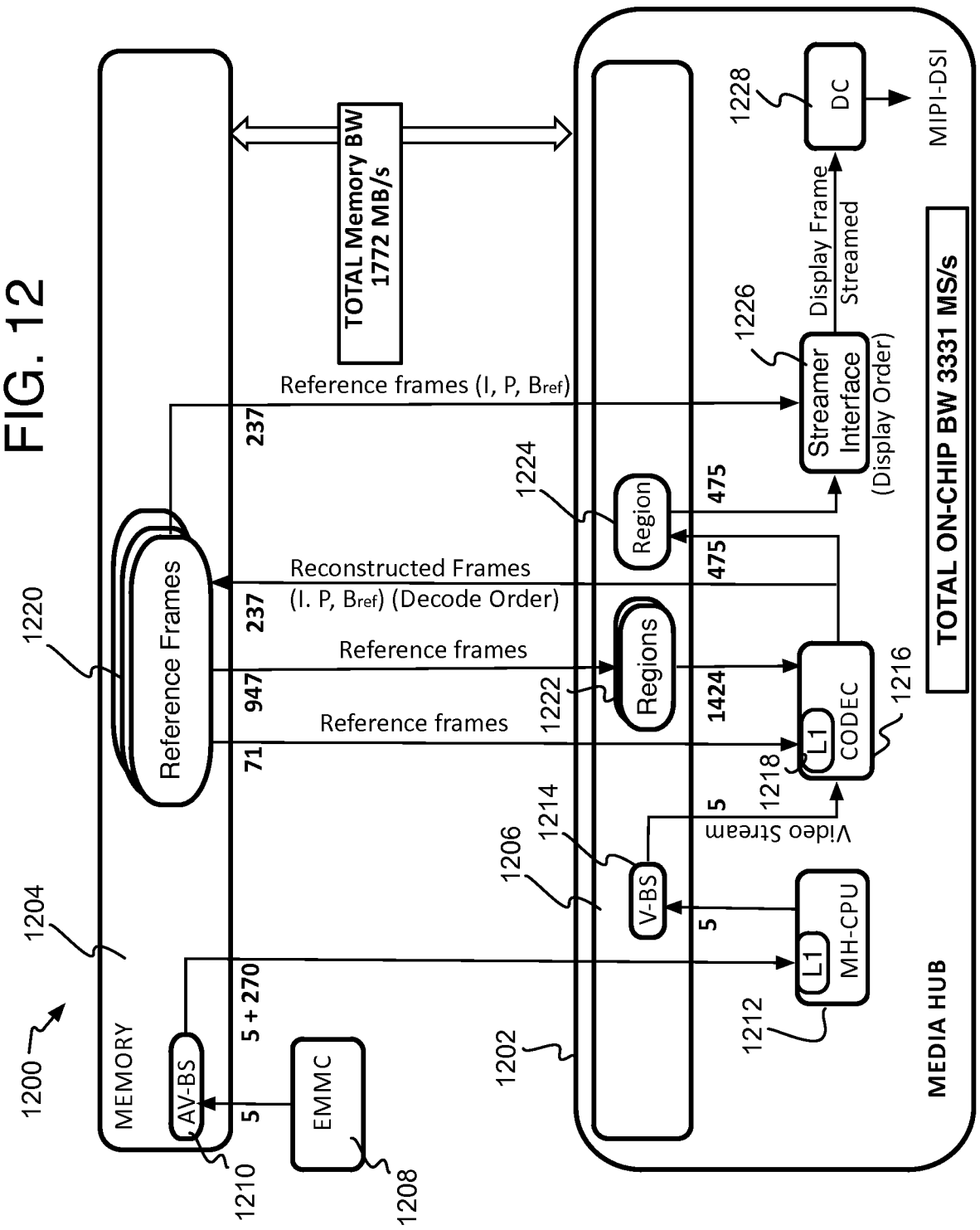
FIG. 12 is an illustrative diagram of an example video coding system for playback and display according to one of the frame re-ordering implementations herein.

Referring to FIG. 12, a system 1200 supports streaming between codec unit (video decoder) and display controller during video playback, and where both coding and display are provided at 4k60. System 1200 may perform process 430 (FIG. 4B) and timeline 600. The system 1200 may have a media hub unit 1202 with a module ML2 1206 that may have, or may be, on-chip or internal temporary memory such as L2 cache or other types of memory that may be provided by an SOC type of architecture. Also, an off-chip or external memory 1204 may be provided as well.

The system 1200 may receive a coded bitstream (in IPBB order) for decoding via an EMMC 1208 and store the AV-BS 1210 on off-chip memory 1204. An MH-CPU 1212 may retrieve the AV-BS 1210 and separate the audio from the video, and then store a V-BS 1214 on the on-chip memory 1206. The video stream in coding order may then be provided to a decoder or codec unit 1216 with an L1 cache 1218. Reconstructed reference frames 1220 are then stored at the off-chip memory 1204 including I, P, and B reference frames. The decoder 1216 then fetches the reference frames as needed either from on-chip L2 cache (region) 1222, or directly from the store of reference frames 1220 on the off-chip memory 1204. The non-reference B-frames are stored at a region 1224 on on-chip memory 1206.

A streamer interface (or re-ordering unit) 1226 then fetches the I and P frames, and B reference frames (if any), from the off-chip memory and streams the non-reference B-frames from the on-chip memory and forms a display sequence in display order (IBBP for example). The display video sequence is then provided to a display controller 1228 for display. This implementation merely uses 1772 MB/s total off-chip memory bandwidth, which is about 43% less bandwidth than without the streaming with system 1100. The on-chip ML2 total bandwidth is 3331 MB/s.

Figure 13:
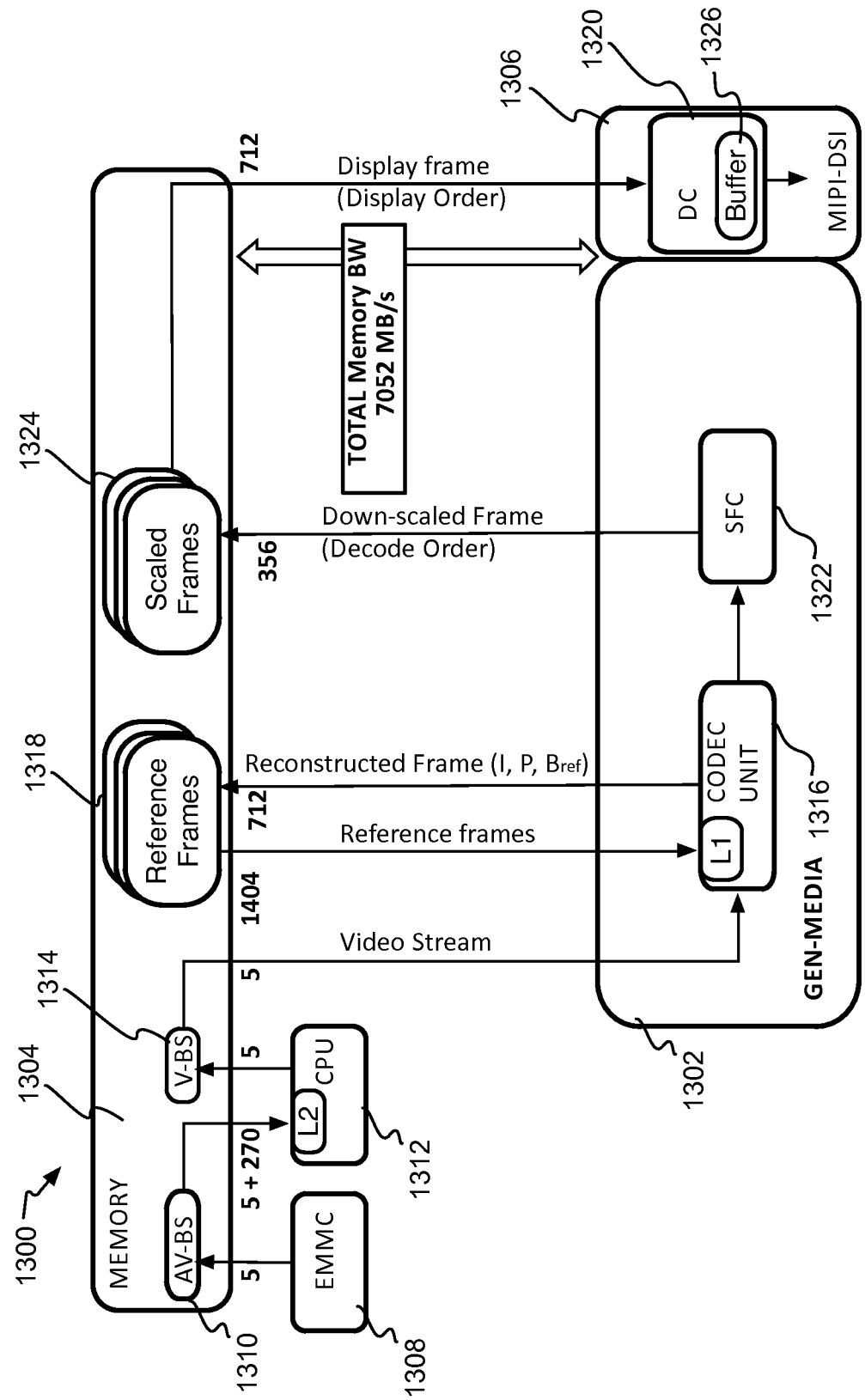
FIG. 13 is an illustrative diagram of an existing video coding system for playback and display at different rates and different scales.

Referring to FIG. 13, another conventional implementation is provided which does not support streaming between coding with a scaling and format converter (SFC) and a display controller during video playback. The SFC changes the size of the images forming the frames by forming a frame of a sampling of the pixels rather than every pixel for example, and by applying formatting algorithms to change the size of the images forming the frames. Here, a system 1300 does convert from 8k30 coding to 4k60 display. Also, system 1300 has similar features to that of system 1100 and are number similarly (general media unit 1302 is similar to general media unit 1102 on system 1100, and so forth). Thus, the similar features need not be described again. System 1300, however, also has the SFC unit 1322 that stores scaled frames 1324 on off-chip memory 1304. The SFC 1322 receives decoded frames from the decoder (codec unit) 1316 in coding order (IPBB). The scaled frames 1324 are stored in coding order and are fetched by the display controller in display order (IBBP). The display controller 1320 may have a display buffer (DSR/PSR) 1326 to store frames while converting the display rate from 30 fps to 60 fps. Such a system 1300 uses 7052 MB/s total off-chip memory bandwidth.

Figure 14:
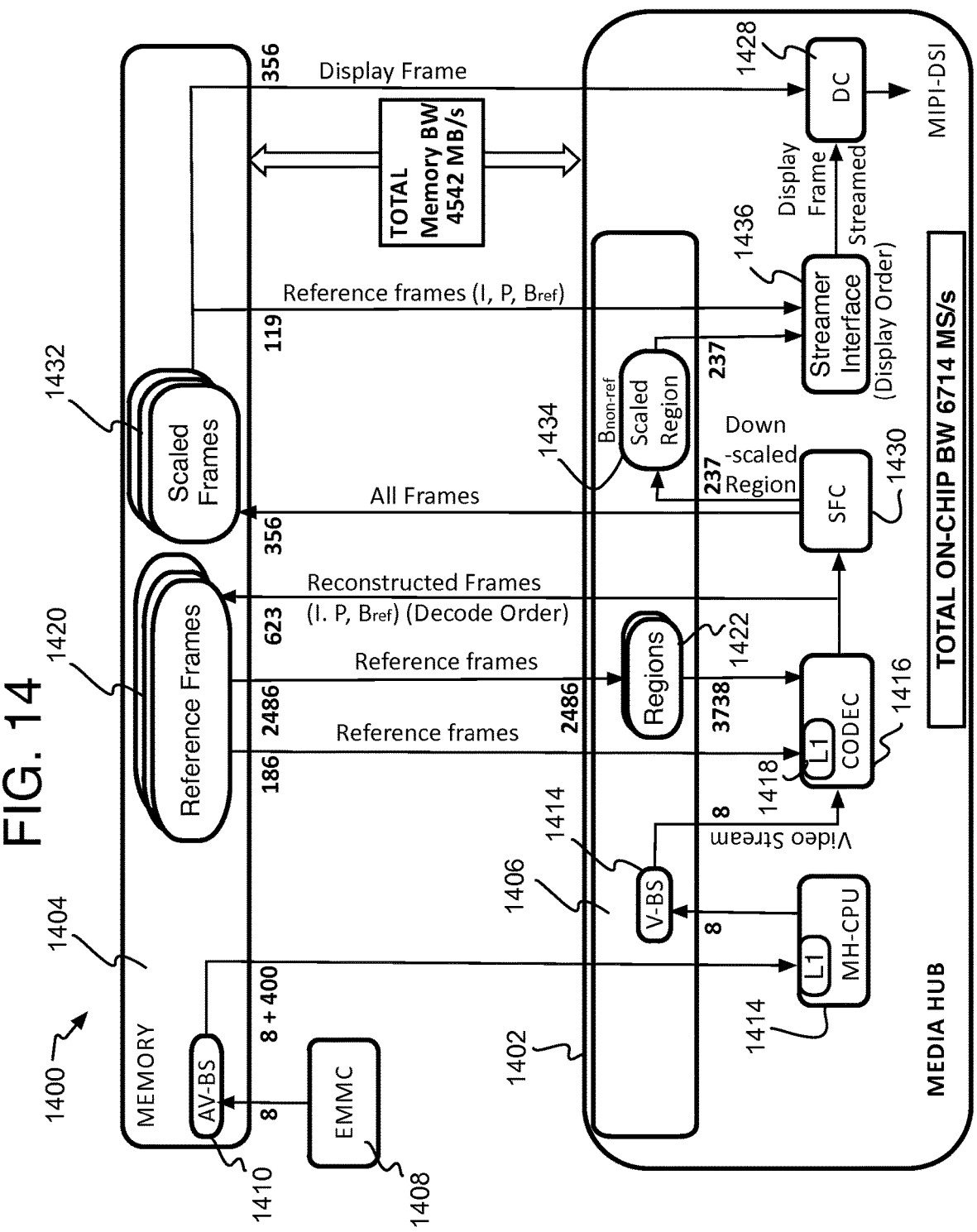
FIG. 14 is an illustrative diagram of an example video coding system for playback and display at different rates and different scales according to one of the frame re-ordering implementations herein.

Referring to FIG. 14, a system 1400 supports streaming between coding with SFC (scaling and format converter) and display controller during video playback, and converting from coding at 8k30 and display at 4k60. System 1400 may perform process 450 (FIG. 4C) and timeline 700 (FIG. 7). System 1400 has components similar to that of system 1200 numbered similarly such that no further description is needed for these components. System 1400 receives a coded bitstream of image data and received by a decoder (codec unit) 1416 similar to that of system 1200. Here, however, system 1400 provides the decoded bitstream in coding order including all frames to a Scale and Format Conversion (SFC) unit 1430 to change the size and format of the frame as explained above. In this case, all of the scaled frames 1432 of all picture types may be written to the off-chip memory 1404. By one example, the display controller 1428 fetches these frames directly when no change in speed is desired, and fetched in display order as needed. Otherwise, the non-reference B-frames are additionally stored in on-chip memory scaled region 1434. A streamer interface (or re-ordering unit) 1436 then builds a display video sequence in display order at the faster display speed (60 fps) by fetching the I and P (and reference B) frames from the scaled frames 1432 written to off-chip memory and streams the non-reference B-frames from the on-chip memory region 1434. As mentioned for timeline 700, the re-ordered display video sequence may be IIBBBBPP . . . by fitting a copy of each frame into a phase of a display frame period of the slower rate so that multiple copies of the same frame fill a display frame period as explained above. The display video sequence of the faster display rate is then streamed to the display controller 1428. The total off-chip memory bandwidth is 4542 MB/s (roughly 36% less than that of conventional system 1300) while the total ML2 bandwidth is 6714 MB/s.

Figure 15:
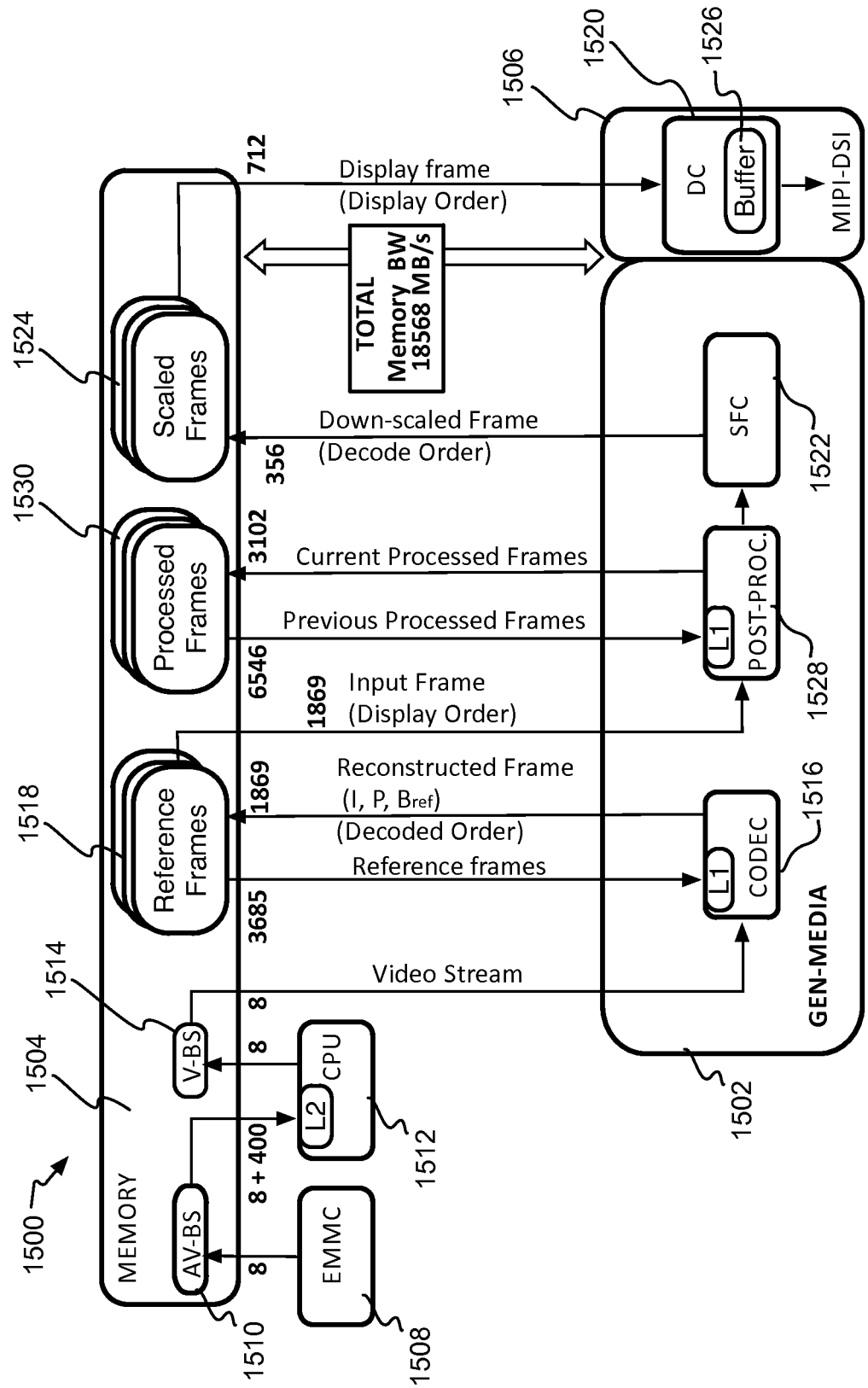
FIG. 15 is an illustrative diagram of an existing video coding system for playback and display at different rates and different scales, and with pre or post processing.

Referring to FIG. 15, another conventional implementation is provided which does not support streaming between the codec unit (video decoder) and the post-processing unit in display order during video playback. This system 1500 also converts 8k30 coding to 4k60 display. Many of the features of system 1500 are the same or similar as that of systems 1100 and 1300 and need not be explained again here. For system 1500, however, all of the decoded frames 1518 may be stored on off-chip memory 1504, and then may be fetched in display order by a post-processing unit 1528 to provide post-processing refinements as already explained above. As mentioned with pre-processing unit 914 (FIG. 9), post-processing unit 1528 may store processed frames 1530 at the off-chip memory 1504 and may retrieve previously processed frames to modify a current frame. The processed frames, still in coding order, may be provided to the SFC 1522 for scaling and further format modifications. Downscaled frames 1524 in coding order may be saved on the off-chip memory 1504. A display controller 1520 may have a buffer 1526 to retrieve the scaled frames 1524 from memory 1504 and in display order, and then convert the display rate, to 60 fps for example, by using its own DSR/PSR buffer 1526. The total memory bandwidth is 18568 MB/s.

Figure 16:
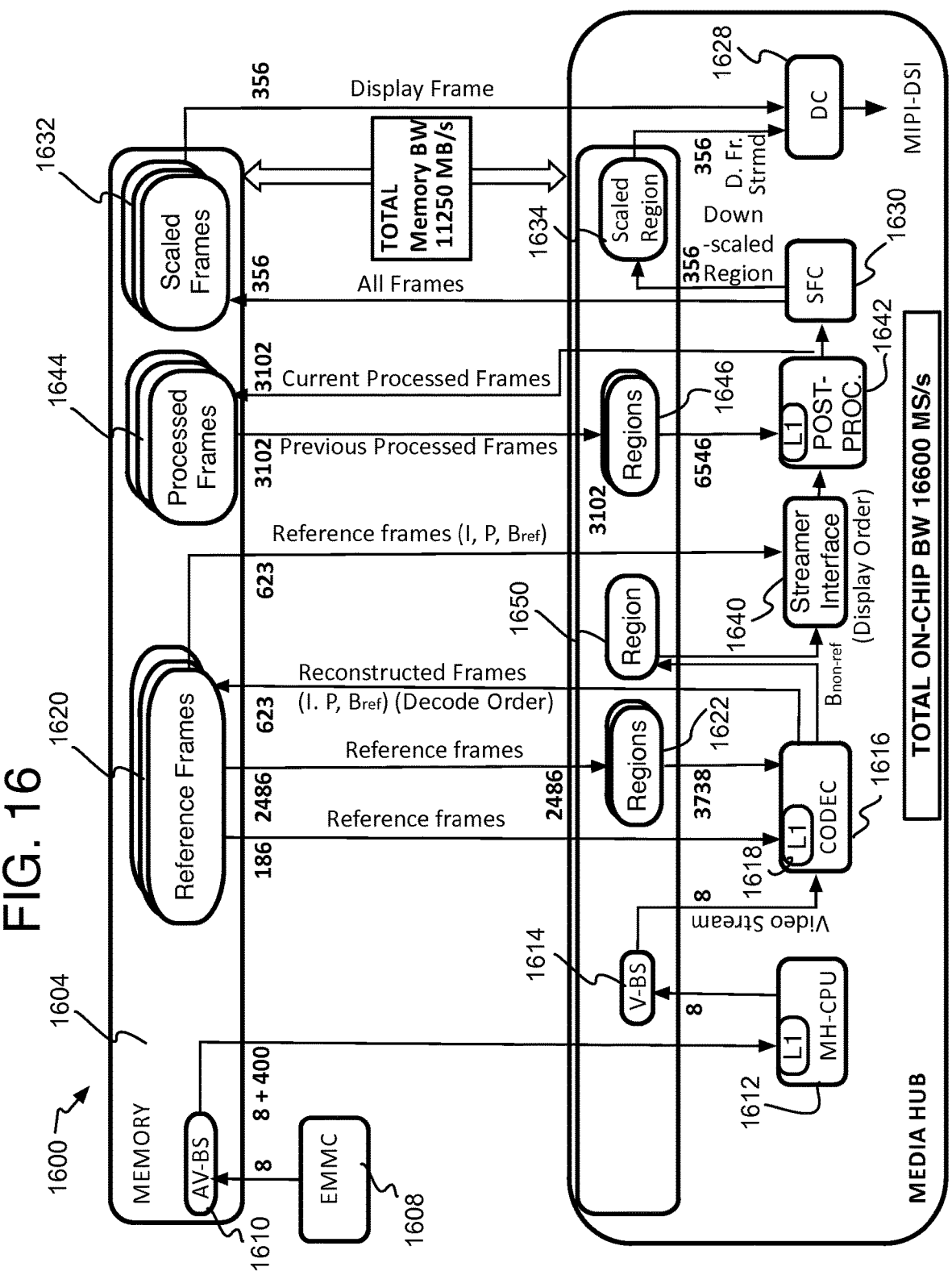
FIG. 16 is an illustrative diagram of an example video coding system for playback and display at different speeds and different scales, and with pre or post processing according to one of the frame re-ordering implementations herein.

Referring to FIG. 16, a system 1600 supports streaming between the codec unit (video decoder) coding and the post-processing unit with scaling for display during video playback, and where coding is provided at 8k30 and display is provided at 4k60. System 1600 has many of the same or similar features as that of systems 1200 or 1400 and are numbered similarly such that further explanation of those features is not needed. System 1600, however, decodes the coding video sequence in coding order (IPBBIPBB . . . ), and then stores the non-reference B-frames at an on-chip local region 1650 on memory 1606 while the reference frames 1620 are stored at off-chip memory. A streamer interface (re-ordering unit) 1640 then fetches the reference frames 1620 from off-chip memory 1604 and streams the non-reference frames 1650 from the on-chip memory 1606 (or effectively from the decoder or from the ISP). The re-ordering unit 1640 then builds a display video sequence in display order and while converting the video sequence to 60 fps frame rate as explained above using multiple copies of the frames from multiple memories to fill a single display frame period of the slower rate. Thus, the resulting display video sequence may have an order of IIBBBBPP . . . .

A post-processing unit 1642 then receives the display video sequence and applies modifications such as image sharpness adjustments and other post-processing refinements. The processed frames 1644 are written to off-chip memory, and previous processed frames may be retrieved, whether or not placed in a cache region 1646 first, to be used to modify a current frame being processed. The processed frames in the display video sequence are then provided to a scaling and format conversion (SFC) unit 1630 as explained for SFC 1430. Here, however, the SFC 1630 also uses on-chip memory to save off-chip memory bandwidth even though the frames are not being re-ordered at this point, albeit the frames are being re-sized. Thus, the SFC 1630 saves the downscaled regions (or frames) to a scaled region 1634 at on-chip memory 1606 while also writing the scaled frames 1632 to off-chip memory, and then the display controller 1628 may stream the downscaled frames from on-chip memory and fetch the scaled frames from off-chip memory and to the display controller 1628 to display the display video sequence. The SFC may store certain types of frames on the on-chip memory instead of, or in addition to, storing frames on the off-chip memory in many different combinations. Here, when the display video sequence has already been converted for a higher frame rate, the SFC may store second copies of the frames in on-chip memory so that at least one copy of individual frames are being streamed, and in this example, one copy of each frame is being streamed while another copy is fetched from off-chip memory so that multiple copies of the same frame fill a single display frame period of the slower rate. By an alternative, the re-ordering unit 1640 may re-order a coding video sequence to a display video sequence without modifying for a change in frame rate. In this case, the SFC unit may handle the task of converting to a faster frame rate as with timeline 800 (FIG. 8). This may or may not be practical depending on the operation of the post-processing operations, or when the SFC needs to operate before the post-processing unit instead of the order shown on system 1600 (FIG. 16).

The total off-chip memory bandwidth for this example is 11250 MB/s which is about 40% less than the non-streamed system 1500, and the total ML2 bandwidth is 16600 MB/s.

Figure 17:
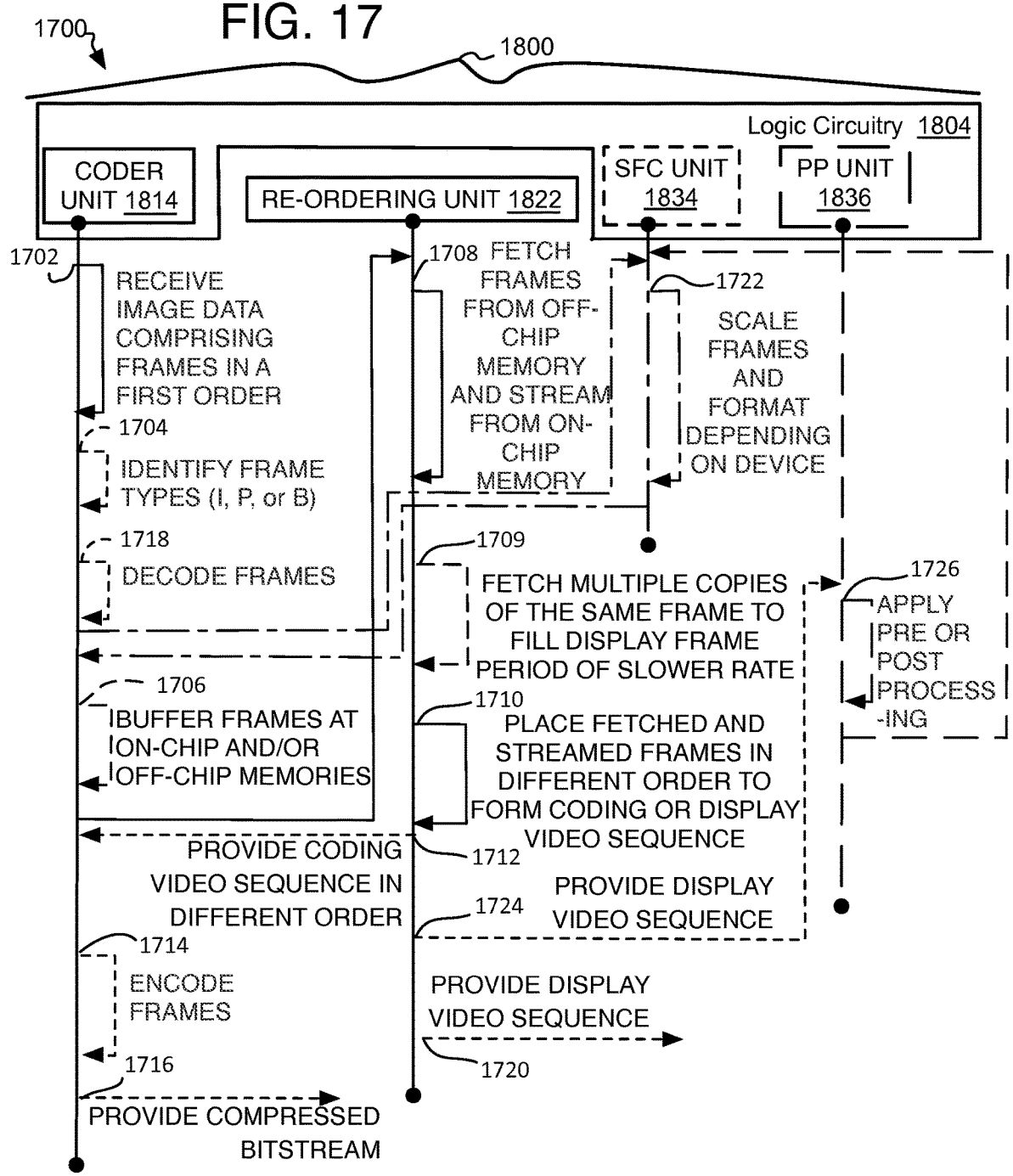
FIG. 17 is an illustrative diagram of an example system in operation for a number of alternative or combinable methods of frame re-ordering from a captured order to a coding order or from a coding order to a display order.

Referring now to FIG. 17, system 1800 may be used for an example frame re-ordering process 1700 for video coding shown in operation, and arranged in accordance with at least some implementations of the present disclosure. In the illustrated implementation, process 1700 is directed to implementations that re-order frames from a capture order to a coding order or from a coding order to a display order. The process 1700 may include one or more operations, functions, or actions as illustrated by one or more of actions 1702 to 1726 numbered evenly, and used alternatively or in many different combinations. By way of non-limiting example, process 1700 will be described with reference to operations discussed with respect to many of the implementations described herein.

Figure 18:
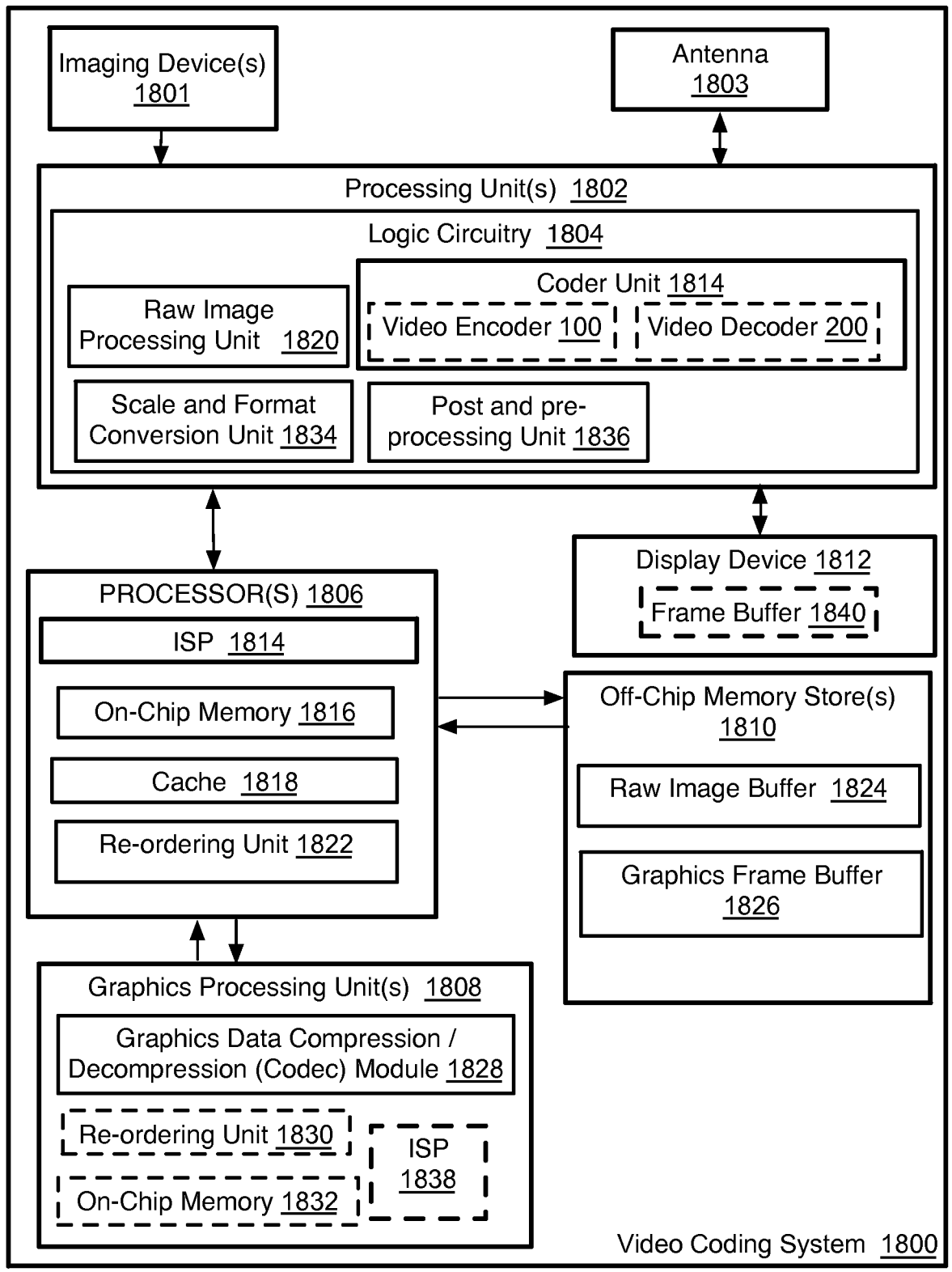
FIG. 18 is an illustrative diagram of an example system.

In the illustrated implementation, system 1800 may include a processing unit 1802 with logic units or logic circuitry or modules 1804, the like, and/or combinations thereof. For one example, logic circuitry or modules 1804 may include a raw image processing unit 1820, a coder unit 1814 with the video decoder 200 and/or video encoder 100 both with inter-prediction functionality, as well as a scale and format conversion unit (SFC) 1834 and a post and pre-processing unit 1836. Also, the system 1800 may have a central processing unit or processor(s) 1806 and/or graphics processing unit(s) 1808 either of which may have, or may be, an ISP and have a re-ordering unit 1822 (also referred to herein as a streaming interface) to construct video sequences from both on-chip and off-chip memories, such as on-chip memory 1816 and off-chip memory 1810. Although system 1800, as shown in FIG. 18, may include one particular set of operations or actions associated with particular modules or units, these operations or actions may be associated with different modules than the particular module or unit illustrated here.

Process 1700 may include "receive image data comprising frames in a first order" 1702. This order may be a coding order (IPBB) when received by a decoding and display device, or the first order may be a capture order (IBBP) when received by an encoding device.

Process 1700 may include "identify frame type (I, P, or B)" 1704. By some forms, this may include identifying reference B-frames and non-reference B-frames. Otherwise, this feature is explained above with other implementations. In some alternatives, it may be possible to skip this operation when solely performed for frame re-ordering and when all frames are being copied to both on-chip and off-chip memories without differentiation by picture type of the frame.

Continuing first with an implementation for encoding, the process 1700 next may include "buffer frames at on-chip and/or off-chip memories" 1706, and by one example where I and B frames are written to off-chip memory while the P-frames are saved at on-chip memory. This is similar to the process shown for timeline 500.

Process 1700 may include "fetch frames from off-chip memory and stream from on-chip memory" 1708. Particularly, when a re-ordering unit is to re-order a capture video sequence in IBBP order to a coding order (IPBB) for a coding video sequence, the frames are obtained from the two different memories in the coding order as explained above.

Process 1700 may include "place fetched and streamed frames in different order to form coding or display video sequence" 1710. Thus, the frames are then placed into the coding video sequence in coding order (See FIG. 5 for example). The P-frames are streamed directly to the video sequence to reduce off-chip memory bandwidth.

Process 1700 then may include "provide coding video sequence in different order" 1712. Thus, by one example form, the coding video sequence is now provided to the coder in coding order, and process 1700 may include "encode frames" 1714. Thereafter, process 1700 may include "provide compressed bitstream" 1716. This operation may include providing the bitstream of compressed data with frame data in coding order for transmission to a decoder.

Alternatively, when decoding a compressed video sequence in a decoded (coding) order (such as IPBB), and then re-ordering the frames to a display order video sequence, process 1700 may include operation 1702 (receive image data) and operation 1704 (identify frame types), and then process 1700 may include "decode frames" 1718. Process 400 then operates "buffer frames at on-chip and/or off-chip memory" 1706 to store the reconstructed frames. By one example result, the reconstructed reference frames such as I and P frames (along with reference B-frames if they are used) are written to off-chip memory, while non-reference B-frames are saved at on-chip memory. This is similar to the process used with timeline 600 (FIG. 6).

Then, re-ordering may occur at operations 1708 and 1710 to fetch the reference frames at the off-chip memory and stream the non-reference frames from the on-chip memory to then place them in different or display order (IBBP . . . ) to form a display video sequence.

Thereafter, the process 1700 may include "provide display video sequence" 1720, and particularly to a display controller or other display device for viewing the video sequence on a screen or storing the display video stream for later viewing.

By another alternative, process 1700 may include "fetch multiple copies of the same frame to fill a display frame period of slower rate" 1709 when there is a conversion in rate from a coding (or capture rate) to a display rate. By one example, this may be a change from 30 fps to 60 fps. In this case, the re-ordering may proceed as with timeline 700 (FIG. 7) where multiple copies of the same frame (at least one from off-chip memory and at least another one from on-chip memory) are placed within a single display frame period of the slower rate. This may be performed for particular picture types of frame (such as B-frames) while multiple copies of frames of other picture types are obtained from off-chip memory only (such as two I-frames (II) or two P-frames (PP)). By other alternatives, all picture types are obtained from both memories. Many variations are possible. Each frame in that case is considered to fill a phase of the display frame period as explained above. Also in this case, the process 400 may then continue with placing the fetched frames (and including the streamed frames) from the off-chip and on-chip memories into the display video sequence. One sequence may be IIBBBBPP . . . order (operation 710). Then, the display video sequence may be provided (1720) as described above.

By yet another alternative, process 1700 may include "scale frames and format depending on device" 1722. In this case, an SFC unit 1834 may scale and format frames for a different size as explained in a number of implementations described above. The scaling may occur after the decoding and in coding order, and the re-ordering then may occur post-scaling with scaled frames such that the storing (1706) and re-ordering operations (1708-1710) are applied next to the scaled frames and as described above for the decoding and the operation proceeds similarly so that the re-ordering unit uses both the on-chip and off-chip memories to reduce off-chip memory bandwidth as described above. This alternative is similar to that of system 1400.

By other alternatives, process 1700 may include "provide display video sequence" 1724, and to a pre or post processing unit 1836. Specifically, after the frames are decoded and placed in display order (operations 1708-1710) and the frame rate changed to 60 fps (where the order is IIBBBBPP . . . ), the process 1700 then may include "apply pre and/or post processing" 1726, and as discussed above with system 1600 (FIG. 16). By one example form, the processed frames are then provided to the SFC unit 1834 for scaling and format conversion (1722) before being buffered again to on-chip and off-chip memories (1706). The assigning of frames to on-chip or off-chip memory, or both is explained above. Once the scaled frames are re-built into a display video sequence, the display video sequence may be provided for display 1720, storage or other use. It will be understood that the scaled frames may not be technically re-ordered and the use of the on-chip memory may be used only to save off-chip memory bandwidth by one example. Thus, in this case, a different unit may perform the buffering and streaming than the re-ordering unit.

While implementation of example process 300, 400, 430, 450, 480, and/or 1700 as well as timelines 500, 600, 700, and 800, may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 18, an example video coding system 1800 for frame re-ordering for video coding may be arranged in accordance with at least some implementations of the present disclosure. In the illustrated implementation, system 1800 may include one or more processors 1806 with on-chip memory 1816, an imagining device(s) 1801 to capture images, an antenna 1803, a display device 1850, and one or more off-chip memory stores 1810. Processor(s) 1806, memory store 1810, and/or display device 1850 may be capable of communication with one another, via, for example, a bus, wires, or other access. In various implementations, display device 1850 may be integrated in system 1800 or implemented separately from system 1800.

As shown in FIG. 18, and discussed above, the processing unit 1802 may have logic circuitry 1804 with a coder unit 1814 that has an encoder 100 and/or a decoder 200. The video encoder 100 and the decoder 200 may have an inter-prediction unit that uses frames of certain picture types as well as other components as described above. Further, either CPU 1806 or a graphics processing unit 1808 may have an ISP 1814 or 1838, and graphics data compression and/or decompression (codec) module 1828. The graphics processing unit, CPU, or other unit also may have a re-ordering unit 1822 and/or 1830 as well as on-chip memory 1816 or 1832, which may be in the form of L2 cache or other memory of SOC-type or similar architecture that at least provides an on-chip memory. Other cache 1818 also may be provided. The off-chip memory 1810 may have a raw image buffer 1824 and/or a graphics frame buffer 1826 to hold frames of a video sequence as described above. The display device 1812 may have its own frame buffer 1840, and by one example, as part of DSR/PSR structure. These components provide many of the functions described herein, and as explained with the processes and timelines described herein.

As will be appreciated, the modules illustrated in FIG. 18 may include a variety of software and/or hardware modules and/or modules that may be implemented via software or hardware or combinations thereof. For example, the modules may be implemented as software via processing units 1802 or the modules may be implemented via a dedicated hardware portion on CPU(s) 1806 (or ISP 1814) or GPU(s) 1808. Furthermore, the memory stores 1810 may be shared memory for processing units 1802, for storing frames and any other data necessary for display and/or coding of image data frames as well as non-video data. The off-chip memory may be RAM or specific types of RAM such as DDR DRAM to name an example and remote from the on-chip L2 cache on the processors 1806 or 1808 by one example. Also, system 1800 may be implemented in a variety of ways. For example, system 1800 (excluding off-chip memory 1810) may be implemented as a single chip or device having a graphics processor, a quad-core central processing unit, and/or a memory controller input/output (I/O) module. In other examples, system 1800 (again excluding off-chip memory 1810) may be implemented as a chipset.

Processor(s) 1806 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 1810 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1810 also may be implemented via remote cache memory in addition to whether or not the on-chip memory 1816 is L2 cache. In various examples, system 1800 may be implemented as a chipset or as a system on a chip (excluding off-chip memory 1810).

In various implementations, the example image processing system 1800 may use the imaging device 1801 to form or receive captured image data. This can be implemented in various ways. Thus, in one form, the image processing system 1800 may be one or more digital cameras or other image capture devices, and imaging device 1801, in this case, may be the camera hardware and camera sensor software, module, or component 1804. In other examples, imaging processing system 1800 may have an imaging device 1801 that includes or may be one or more cameras, and logic modules 1804 may communicate remotely with, or otherwise may be communicatively coupled to, the imaging device 1801 for further processing of the image data.

Thus, image processing device 1800 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1801 may include camera hardware and optics including one or more sensors as well as auto-focus, zoom, aperture, ND-filter, auto-exposure, flash, and actuator controls. The imaging device 1801 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1801 may be provided with an eye tracking camera.

Otherwise, the imaging device 1801 may be any other device that records, displays or processes digital images such as video game panels or consoles, set top boxes, and so forth.

As illustrated, any of these components may be capable of communication with one another and/or communication with portions of logic modules 1804 and/or imaging device 1801. Thus, processors 1806 or 1808 may be communicatively coupled to both the image device 1801 and the logic modules 1804 for operating those components. By one approach, although image processing system 1800, as shown in FIG. 18, may include one particular set of blocks or actions associated with particular components or modules, these blocks or actions may be associated with different components or modules than the particular component or module illustrated here.

Figure 19:
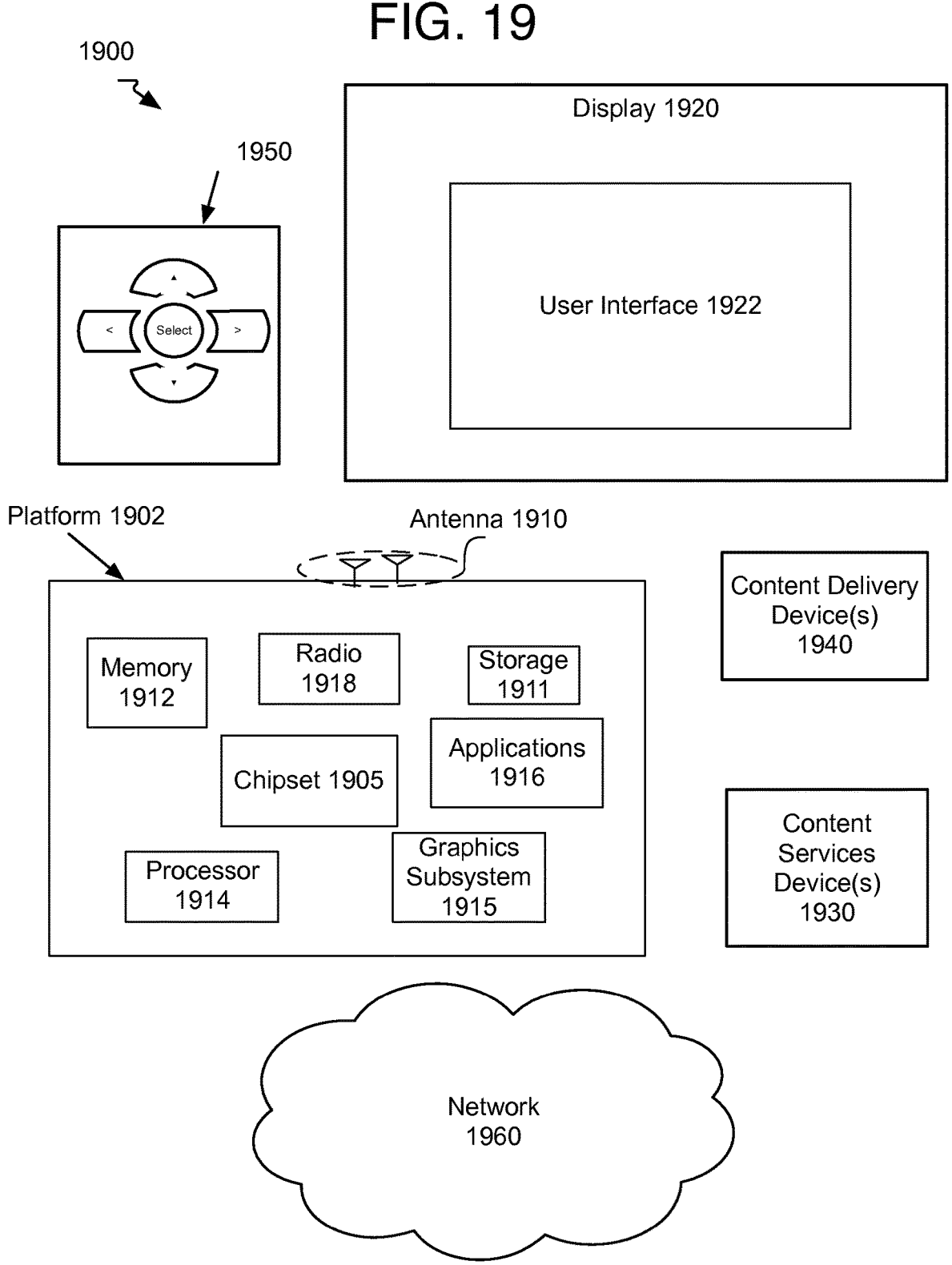
FIG. 19 is an illustrative diagram of another example system.

Referring to FIG. 19, an example system 1900 in accordance with the present disclosure and various implementations, may be a media system although system 1900 is not limited to this context. For example, system 1900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 communicatively coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1914, memory 1912, storage 1911, graphics subsystem 1915, applications 1916 and/or radio 1918 as well as antenna(s) 1910. Chipset 1905 may provide intercommunication among processor 1914, memory 1912, storage 1911, graphics subsystem 1915, applications 1916 and/or radio 1918. For example, chipset 1905 may include a storage adapter (not depicted) capable of providing intercommunication with storage 1911.

Processor 1914 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1914 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1911 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1911 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1914 or chipset 1905. In some implementations, graphics subsystem 1915 may be a stand-alone card communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In implementations, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various implementations, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
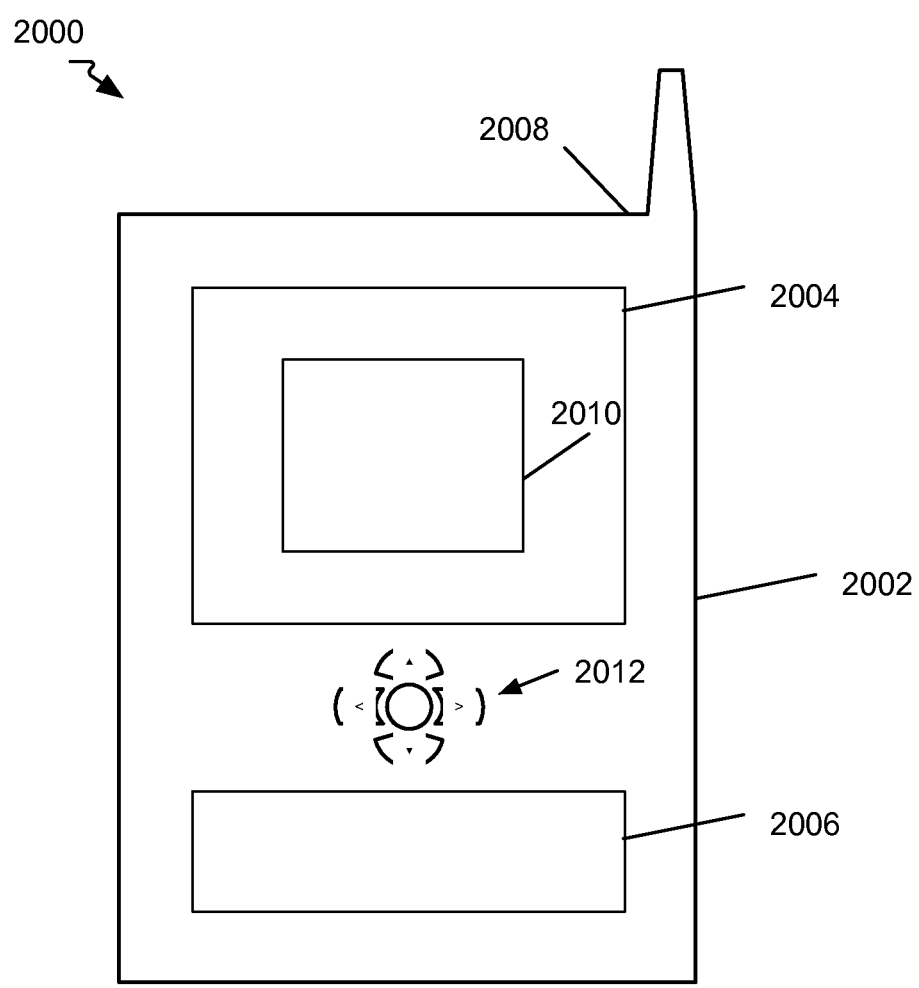
FIG. 20 illustrates another example device, all arranged in accordance with at least some implementations of the present disclosure.

As described above, system 1800 or 1900 may be implemented in varying physical styles or form factors. FIG. 20 illustrates implementations of a small form factor device 2000 in which system 1800 or 1900 may be implemented. In implementations, for example, device 2000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile intern& device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 20, device 2000 may include a housing 2002, a display 2004, an input/output (I/O) device 2006, and an antenna 2008. Device 2000 also may include navigation features 2012. Display 2004 may include any suitable screen 2010 on a display unit for displaying information appropriate for a mobile computing device. I/O device 2006 may include any suitable I/O device for entering information into a mobile computing device. Examples for I/O device 2006 may include an alphanumeric keyboard, a numeric keypad, a touch pad, input keys, buttons, switches, rocker switches, microphones, speakers, voice recognition device and software, and so forth. Information also may be entered into device 2000 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus rates and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of frame re-ordering for video coding comprises receiving local frames of image data of a first video sequence having frames in a first order and from an on-chip memory; receiving frames of the first video sequence from an off-chip memory; re-ordering the frames into a second video sequence having a second order different from the first order and comprising placing the local frames in the second video sequence according to the second order and with frames from the off-chip memory; and providing the frames in the second video sequence to code or display the image data.

By another implementation, the method may comprise that at least one of: the first order is a captured order as the frames were captured by an image capturing device and the second order is a coding order of frames as the frames are to be encoded, the first order is a captured order as the frames were captured by an image capturing device and the second order is a display order as the frames are to be displayed, and the first order is a coding order to decode the frames and the second order is a display order as the frames are to be displayed. The method also may comprise that at least one of: I-frames and B-frames are provided to off-chip memory while P-frames are provided to on-chip memory rather than off-chip memory in order to be re-ordered to the second order in the second video sequence, I-frames, B-frames, and P-frames are provided to both on-chip memory and off-chip memory so that frame copies of the same frame from both on-chip and off-chip memories are re-ordered to the second order in the second video sequence, I-frames and P-frames are provided to off-chip memory while B-frames are provided to on-chip memory rather than off-chip memory in order to be re-ordered to the second order in the second video sequence, and I-frames and P-frames are provided to off-chip memory while B-frames are provided to both on-chip memory and off-chip memory so that B-frame copies of the same frame from both on-chip and off-chip memories are re-ordered to the second order in the second video sequence. The method may comprise that at least one of: one of the orders is repeating IBBP and the other order is repeating IPBB, and one of the orders is repeating IBBP or IPBB, and the other order is repeating IIBBBBPP or IIPPBBBB; wherein the first video sequence order is associated with a first rate and the second video sequence order is associated with a second rate different from the first rate, wherein the local frames and copies of the local frames in an off-chip memory are both placed in the second video sequence in the second order, wherein individual display frame periods of the first video sequence order are replaced with multiple frames of the second video sequence order wherein at least one of the multiple frames is from the on-chip memory and another of the multiple frames is from the off-chip memory for individual display frames periods. The method comprises buffering some frames of a video sequence at off-chip memory and other frames of the video sequence at on-chip memory rather than off-chip memory or in addition to off-chip memory after scaling, formatting, and/or enhancing the image data of the frames; and re-forming the video sequence with the frames of the off-chip and on-chip memory in display order.

By yet another implementation, a computer-implemented system has a at least one display; at least one on-chip memory and at least one off-chip memory to receive frames of image data; at least one processor communicatively coupled to the memories and display; and at least one re-ordering unit operated by the at least one processor and arranged to: receive local frames of image data of a first video sequence having frames in a first order and from an on-chip memory; receive frames of the first video sequence from an off-chip memory; re-order the frames into a second video sequence having a second order different from the first order and comprising placing the local frames in the second video sequence according to the second order and with frames from the off-chip memory; and provide the frames in the second video sequence to code or display the image data.

By another implementation, the system is arranged so that at least one of: the first order is a captured order as the frames were captured by an image capturing device and the second order is a coding order of frames as the frames are to be encoded, the first order is a captured order as the frames were captured by an image capturing device and the second order is a display order as the frames are to be displayed, and the first order is a coding order to decode the frames and the second order is a display order as the frames are to be displayed. The system wherein at least one of: I-frames and B-frames are provided to off-chip memory while P-frames are provided to on-chip memory rather than off-chip memory in order to be re-ordered to the second order in the second video sequence, I-frames, B-frames, and P-frames are provided to both on-chip memory and off-chip memory so that frame copies of the same frame from both on-chip and off-chip memories are re-ordered to the second order in the second video sequence, I-frames and P-frames are provided to off-chip memory while B-frames are provided to on-chip memory rather than off-chip memory in order to be re-ordered to the second order in the second video sequence, and I-frames and P-frames are provided to off-chip memory while B-frames are provided to both on-chip memory and off-chip memory so that B-frame copies of the same frame from both on-chip and off-chip memories are re-ordered to the second order in the second video sequence. The system wherein at least one of: one of the orders is repeating IBBP and the other order is repeating IPBB, and one of the orders is repeating IBBP or IPBB, and the other order is repeating IIBBBBPP or IIPPBBBB; wherein the first video sequence order is associated with a first rate and the second video sequence order is associated with a second rate different from the first rate, wherein the local frames and copies of the local frames in an off-chip memory are both placed in the second video sequence in the second order, wherein individual display frame periods of the first video sequence order are replaced with multiple frames of the second video sequence order wherein at least one of the multiple frames is from the on-chip memory and another of the multiple frames is from the off-chip memory for individual display frames periods. The re-ordering unit may be arranged to buffer some frames of a video sequence at off-chip memory and other frames of the video sequence at on-chip memory rather than off-chip memory or in addition to off-chip memory after scaling, formatting, and/or enhancing the image data of the frames; and re-form the video sequence with the frames of the off-chip and on-chip memory in display order.

By one approach, at least one computer readable medium has stored thereon instructions that when executed cause a computing device to: receive local frames of image data of a first video sequence having frames in a first order and from an on-chip memory; receive frames of the first video sequence from an off-chip memory; re-order the frames into a second video sequence having a second order different from the first order and comprising placing the local frames in the second video sequence according to the second order and with frames from the off-chip memory; and provide the frames in the second video sequence to code or display the image data.

By another implementation, the instructions may include that at least one of: the first order is a captured order as the frames were captured by an image capturing device and the second order is a coding order of frames as the frames are to be encoded, the first order is a captured order as the frames were captured by an image capturing device and the second order is a display order as the frames are to be displayed, and the first order is a coding order to decode the frames and the second order is a display order as the frames are to be displayed. The instructions may include that at least one of: I-frames and B-frames are provided to off-chip memory while P-frames are provided to on-chip memory rather than off-chip memory in order to be re-ordered to the second order in the second video sequence, I-frames, B-frames, and P-frames are provided to both on-chip memory and off-chip memory so that frame copies of the same frame from both on-chip and off-chip memories are re-ordered to the second order in the second video sequence, I-frames and P-frames are provided to off-chip memory while B-frames are provided to on-chip memory rather than off-chip memory in order to be re-ordered to the second order in the second video sequence, and I-frames and P-frames are provided to off-chip memory while B-frames are provided to both on-chip memory and off-chip memory so that B-frame copies of the same frame from both on-chip and off-chip memories are re-ordered to the second order in the second video sequence. The instructions may include that at least one of: one of the orders is repeating IBBP and the other order is repeating IPBB, and one of the orders is repeating IBBP or IPBB, and the other order is repeating IIBBBBPP or IIPPBBBB; wherein the first video sequence order is associated with a first rate and the second video sequence order is associated with a second rate different from the first rate, wherein the local frames and copies of the local frames in an off-chip memory are both placed in the second video sequence in the second order, wherein individual display frame periods of the first video sequence order are replaced with multiple frames of the second video sequence order wherein at least one of the multiple frames is from the on-chip memory and another of the multiple frames is from the off-chip memory for individual display frames periods. The instructions when executed causing the computing device to buffer some frames of a video sequence at off-chip memory and other frames of the video sequence at on-chip memory rather than off-chip memory or in addition to off-chip memory after scaling, formatting, and/or enhancing the image data of the frames; and re-form the video sequence with the frames of the off-chip and on-chip memory in display order.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
    receiving video frames of image data of a first video sequence having frames in a first order, wherein each video frame is a separate image;
    performing a processing operation that modifies image data of the video frames to form local video frames;
    directly after the processing operation, placing the local video frames of the first video sequence into an on-chip cache memory, said on-chip cache memory with a capacity of a region of a single frame at a time, wherein said region is less than an entire frame, and without first obtaining the local video frames from an off-chip memory;
    receiving other frames of the first video sequence from the off-chip memory;
    re-ordering the frames into a second video sequence having a second order different from the first order and comprising obtaining the local video frames via the on-chip memory without use of the off-chip memory and placing the local frames in the second video sequence according to the second order and with frames from the off-chip memory;
    providing the frames in the second video sequence to code or display the image data;
    wherein the first video sequence order is associated with a first rate and the second video sequence order is associated with a second rate different from the first rate; and
    wherein individual display frame periods of the first video sequence order are replaced with multiple frames of the second video sequence order comprising placing one frame from on-chip memory and a copy of the same frame from off-chip memory respectively in two consecutive frame spaces of the second video sequence order.

2. The method of claim 1 wherein the first order is a captured order as the frames were captured by an image capturing device and the second order is a coding order of frames as the frames are to be encoded.

3. The method of claim 1 wherein the first order is a captured order as the frames were captured by an image capturing device and the second order is a display order as the frames are to be displayed.

4. The method of claim 1 wherein the first order is a coding order to decode the frames and the second order is a display order as the frames are to be displayed.

5. The method of claim 1 wherein I-frames and B-frames are provided to off-chip memory while P-frames are provided to on-chip memory rather than off-chip memory in order to be re-ordered to the second order in the second video sequence.

6. The method of claim 1 wherein I-frames, B-frames, and P-frames are provided to both on-chip memory and off-chip memory so that frame copies of the same frame from both on-chip and off-chip memories are re-ordered to the second order in the second video sequence.

7. The method of claim 1 wherein I-frames and P-frames are provided to off-chip memory while B-frames are provided to on-chip memory rather than off-chip memory in order to be re-ordered to the second order in the second video sequence.

8. The method of claim 1 wherein I-frames and P-frames are provided to off-chip memory while B-frames are provided to both on-chip memory and off-chip memory so that B-frame copies of the same frame from both on-chip and off-chip memories are re-ordered to the second order in the second video sequence.

9. The method of claim 1 wherein the local frames and copies of the local frames in an off-chip memory are both placed in the second video sequence in the second order.

10. The method of claim 1 comprising buffering some frames of a video sequence at off-chip memory and other frames of the video sequence at on-chip memory rather than off-chip memory or in addition to off-chip memory after scaling, formatting, and/or enhancing the image data of the frames; and
    re-forming the video sequence with the frames of the off-chip and on-chip memory in display order.

11. A computer-implemented system comprising:
    at least one display;
    at least one on-chip memory and at least one off-chip memory to receive frames of image data;

at least one processor communicatively coupled to the memories and display, and arranged to:

receive video frames of image data of a first video sequence having frames in a first order, wherein each video frame is a separate image;

perform a processing operation that modifies image data of the video frames to form local video frames;

directly after the processing operation, place the local video frames of the first video sequence into an on-chip cache memory, said on-chip cache memory with a capacity of a region of a single frame at a time, wherein said region is less than an entire frame, and without first obtaining the local video frames from an off-chip memory;

receive other frames of the first video sequence from the off-chip memory;

re-order the frames into a second video sequence having a second order different from the first order and comprising obtaining the local video frames via the on-chip memory without use of the off-chip memory and placing the local frames in the second video sequence according to the second order and with frames from the off-chip memory;

provide the frames in the second video sequence to code or display the image data; and wherein the first video sequence order is associated with a first frame rate and the second video sequence order is associated with a second frame rate different from the first frame rate, and wherein the at least one processor being arranged to operate by placing both one frame from on-chip memory and a copy of the same frame from off-chip memory respectively in two consecutive frame spaces of the second video sequence order.

12. The system of claim 11 wherein the first order is a captured order as the frames were captured by an image capturing device and the second order is a coding order of frames as the frames are to be encoded.

13. The system of claim 11 wherein the first order is a captured order as the frames were captured by an image capturing device and the second order is a display order as the frames are to be displayed.

14. The system of claim 11 wherein the first order is a coding order to decode the frames and the second order is a display order as the frames are to be displayed.

15. The system of claim 11 wherein I-frames and B-frames are provided to off-chip memory while P-frames are provided to on-chip memory rather than off-chip memory in order to be re-ordered to the second order in the second video sequence.

16. The system of claim 11 wherein I-frames, B-frames, and P-frames are provided to both on-chip memory and off-chip memory so that frame copies of the same frame from both on-chip and off-chip memories are re-ordered to the second order in the second video sequence.

17. The system of claim 11 wherein I-frames and P-frames are provided to off-chip memory while B-frames are provided to on-chip memory rather than off-chip memory in order to be re-ordered to the second order in the second video sequence.

18. At least one non-transitory computer-readable medium having stored thereon instructions that when executed cause a computing device to:

receive video frames of image data of a first video sequence having frames in a first order, wherein each video frame is a separate image;

perform a processing operation that modifies image data of the video frames to form local video frames;

directly after the processing operation, place the local video frames of the first video sequence into an on-chip cache memory, said on-chip cache memory with a capacity of a region of a single frame at a time, wherein said region is less than an entire frame, and without first obtaining the local video frames from an off-chip memory;

receive other frames of the first video sequence from the off-chip memory;

re-order the frames into a second video sequence having a second order different from the first order and comprising obtaining the local video frames via the on-chip memory without use of the off-chip memory and placing the local frames in the second video sequence according to the second order and with frames from the off-chip memory; and provide the frames in the second video sequence to code or display the image data; and wherein the first video sequence order is associated with a first frame rate and the second video sequence order is associated with a second frame rate different from the first frame rate, and wherein the instructions cause the computing device to operate by placing both one frame from on-chip memory and a copy of the same frame from off-chip memory respectively in two consecutive frame spaces of the second video sequence order.

19. The method of claim 1 wherein the processing operation is: (1) pre-processing before providing the local and other frames to an encoder from the on and off chip memories, (2) decoding before storing the local and other frames in the on and off chip memories respectively, or (3) scaling before storing the local and other frames in the on and off chip memories respectively.

20. The system of claim 11 wherein the processing operation is: (1) pre-processing before providing the local and other frames to an encoder from the on and off chip memories, (2) decoding before storing the local and other frames in the on and off chip memories respectively, or (3) scaling before storing the local and other frames in the on and off chip memories respectively.

21. The medium of claim 18 wherein the processing operation is: (1) pre-processing before providing the local and other frames to an encoder from the on and off chip memories, (2) decoding before storing the local and other frames in the on and off chip memories respectively, or (3) scaling before storing the local and other frames in the on and off chip memories respectively.

* * * * *